(12) United States Patent
Genchev et al.

(10) Patent No.: US 12,177,227 B2
(45) Date of Patent: Dec. 24, 2024

(54) METHODS AND APPARATUS TO EXPOSE CLOUD INFRASTRUCTURE RESOURCES TO TENANTS IN A MULTI-TENANT SOFTWARE SYSTEM

(71) Applicant: VMware LLC, Palo Alto, CA (US)

(72) Inventors: Stoyan Genchev, Sofia (BG); Ilia Pantchev, Sofia (BG); Marin Dzhigarov, Sofia (BG); Dimitar Ivanov, Sofia (BG); Daniel Pavlov, Sofia (BG); Zhan Ivanov, Sofia (BG); Valentina Reutova, London (GB); Grigor Ganekov, Sofia (BG); Ina Uzunova, Sofia (BG); Albena Kertova, Sofia (BG)

(73) Assignee: VMware LLC, Palo Alto, CA (US)

( * ) Notice: Subject to any disclaimer, the term of this patent is extended or adjusted under 35 U.S.C. 154(b) by 536 days.

(21) Appl. No.: 17/494,618

(22) Filed: Oct. 5, 2021

(65) Prior Publication Data

US 2023/0106025 A1    Apr. 6, 2023

(51) Int. Cl.
*G06F 9/46* (2006.01)
*G06F 9/50* (2006.01)
*H04L 9/40* (2022.01)
*H04L 47/70* (2022.01)

(52) U.S. Cl.
CPC .......... *H04L 63/107* (2013.01); *G06F 9/5077* (2013.01); *H04L 47/82* (2013.01); *H04L 63/102* (2013.01)

(58) Field of Classification Search
CPC .................................................. G06F 9/5077
See application file for complete search history.

(56) References Cited

U.S. PATENT DOCUMENTS

| | | | |
|---|---|---|---|
| 10,044,795 B2 | 8/2018 | Reddy et al. | |
| 2011/0058202 A1* | 3/2011 | St. Jacques, Jr. | .. H04N 1/00233 358/1.13 |
| 2014/0280940 A1* | 9/2014 | Chapman | ................ H04L 63/02 709/225 |
| 2015/0381425 A1* | 12/2015 | Kansal | ................ H04L 43/0888 709/224 |
| 2016/0013974 A1 | 1/2016 | Reddy et al. | |

\* cited by examiner

*Primary Examiner* — Gregory A Kessler
(74) *Attorney, Agent, or Firm* — Quarles & Brady LLP

(57) ABSTRACT

Methods, apparatus, systems, and articles of manufacture are disclosed for provisioning cloud infrastructure resources, the apparatus comprising: resource bundling circuitry to select cloud infrastructure resources to bundle as a virtual private zone; provisioning circuitry to provision the cloud infrastructure resources; and allocation circuitry to allocate the virtual private zone to a first tenant, the first tenant authorized to access the cloud infrastructure resources bundled in the virtual private zone.

27 Claims, 20 Drawing Sheets

```
4       TABLE PLACEMENTZONE AS PZ {
5               ID STRING [PK]
6       660     NAME STRING
7               COMPUTEIDS JSONB //// ALL POINT TO COMPUTE STATE.ID
8               ENDPOINTREGIONID   STRING    [REF: > ENDPOINTREGION.ID]
9       670     TYPE STRING
10              TENANTORGID STRING
11              ORGID STRING
12      }
13
14      TABLE ENDPOINTSTATE AS E {
15              ID STRING [PK]
16              NAME STRING
17              TYPE STRING
18              ORGID STRING
19      }
20
21      TABLE ENDPOINTREGION AS ER {
22              ID STRING [PK]
23              NAME STRING
24              ENDPOINTID STRING [REF: > ENDPOINTSTATE.ID]
25              ORGID STRING
26      }
27
28      TABLE COMPUTESTATE AS C {
29              ID STRING [PK]
30              NAME STRING
31              ENDPOINTID STRING [REF: > ENDPOINTSTATE.ID]
32              ENDPOINTREGIONID STRING [REF: > ENDPOINTREGION.ID]
33              ORGID STRING
34      }
35
36      TABLE IMAGEPROFILESTATE AS IP {
37              ID STRING [PK]
38              NAME STRING
39              IMAGEMAPPING JSONB
40              ENDPOINTREGIONID STRING [REF: > ENDPOINTREGION.ID]
41              VPZID STRING [REF: > PLACEMENTZONE.ID]
42              ORGID STRING
43      }
44
45      TABLE INSTANCETYPESTATE AS IT {
46              ID STRING [PK]
47              NAME STRING
48              INSTANCETYPEMAPPING JSONB
49              ENDPOINTREGIONID STRING [REF: > ENDPOINTREGION.ID]
50              VPZID STRING [REF: > PLACEMENTZONE.ID]
51              ORGID STRING
52      }
53
54      TABLE NETWORKPROFILE AS NP {
55              ID STRING [PK]
56              NAME STRING
57              SUBNETLINKS JSONB
58              SECURITYGROUPLINKS JSONB
59              LOADBALANCERLINKS JSONB
60              ISOLATIONTYPE JSONB
61              ENDPOINTREGIONID STRING [REF:> ENDPOINTREGION.ID]
62              VPZID STRING [REF :> PLACEMENTZONE.ID]
63              ORGID STRING
64      }
65
66      TABLE STORAGEPROFILE AS SP {
67              ID STRING [PK]
68              NAME STRING
69              STORAGEITEMS JSONB
70              ENDPOINTREGIONID STRING [REF: > ENDPOINTREGION.ID]
71              VPZID STRING [REF: > PLACEMENTZONE.ID]
72              ORGID STRING
73      }
```

FIG. 6B

METHODS AND APPARATUS TO EXPOSE CLOUD INFRASTRUCTURE RESOURCES TO TENANTS IN A MULTI-TENANT SOFTWARE SYSTEM

FIELD OF THE DISCLOSURE

This disclosure relates generally to cloud computing and, more particularly, to methods and apparatus to expose cloud infrastructure resources to tenants in a multi-tenant software system.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 6B is an illustration of example machine readable instructions, that when executed by processor circuitry, implement the example virtual private zone.

Figure 1:
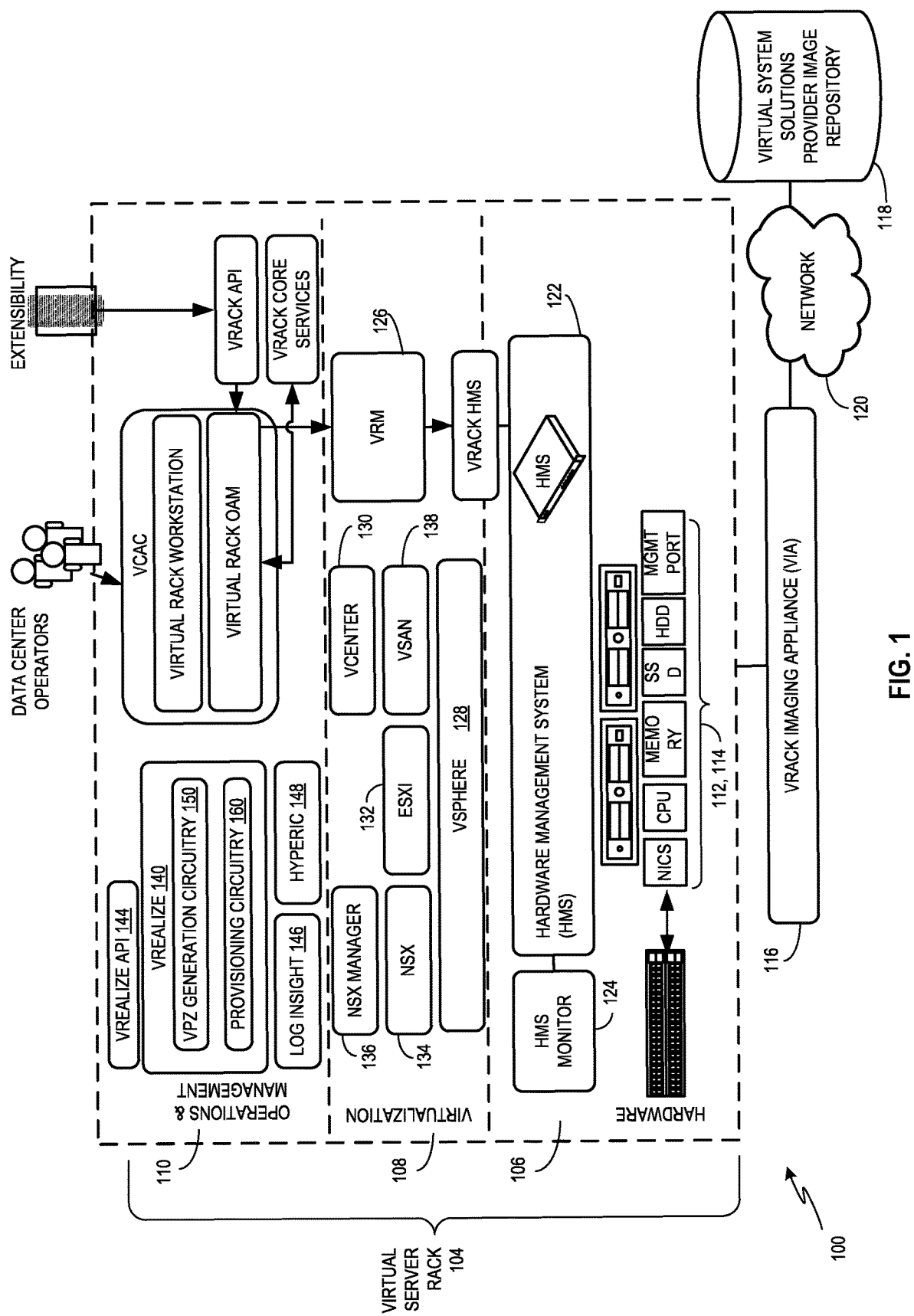
FIG. 1 is an illustration of a virtual server rack to implement a virtual cloud computing environment offered by a cloud provider.

The figures are not to scale. As used herein, connection references (e.g., attached, coupled, connected, and joined) may include intermediate members between the elements referenced by the connection reference. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Cloud computing is based on the deployment of many physical resources across a network, virtualizing the physical resources into virtual resources, and provisioning the virtual resources to perform cloud computing services and applications. In some instances, a virtual machine is generated based on a compilation of the virtual resources in which the virtual resources are based on the virtualization of corresponding physical resources. A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example. Virtual cloud computing uses networks of remote servers, computers and/or computer programs to manage access to centralized resources and/or services, to store, manage, and/or process data. Virtual cloud computing enables businesses and large organizations to scale up information technology (IT) requirements as demand or business needs increase. Virtual cloud computing relies on sharing resources to achieve coherence and economies of scale over a network. In some example cloud computing environments, an organization may store sensitive client data in-house on a private cloud application, but interconnect to a business intelligence application provided on a public cloud software service. In such examples, a cloud may extend capabilities of an enterprise, for example, to deliver a specific business service through the addition of externally available public cloud services. In some examples, cloud computing permits multiple users to access a single server to retrieve and/or update data without purchasing licenses for different applications.

Prior to cloud computing, as resources and data increased based on increased business needs or demands, computing systems required the addition of significantly more data storage infrastructure. Virtual cloud computing accommodates increases in workflows and data storage demands without significant efforts of adding more hardware infrastructure. For example, businesses may scale data storage allocation in a cloud without purchasing additional infrastructure.

Cloud computing comprises a plurality of key characteristics. First, cloud computing allows software to access application programmable interfaces (APIs) that enable machines to interact with cloud software in the same way that a traditional user interface (e.g., a computer desktop) facilitates interaction between humans and computers. Second, cloud computing enables businesses or large organizations to allocate expenses on an operational basis (e.g., on a per-use basis) rather than a capital basis (e.g., equipment purchases). Costs of operating a business using, for example, cloud computing, are not significantly based on purchasing fixed assets but are instead more based on maintenance of existing infrastructure. Third, cloud computing enables convenient maintenance procedures because computing applications are not installed on individual users' physical computers but are instead installed at one or more servers forming the cloud service. As such, software can be accessed and maintained from different places (e.g., from an example virtual cloud).

Information technology (IT) is the application of computers and telecommunications equipment to store, retrieve, transmit and/or manipulate data, often in the context of a business or other enterprise. For example, databases store large amounts of data to enable quick and accurate information storage and retrieval. IT service management refers to the activities (e.g., directed by policies, organized and structured in processes and supporting procedures) that are performed by an organization or part of an organization to plan, deliver, operate and control IT services that meet the needs of customers. IT management may, for example, be performed by an IT service provider through a mix of people, processes, and information technology. In some examples, an IT system administrator is a person responsible for the upkeep, configuration, and reliable operation of computer systems: especially multi-user computers, such as servers that seek to ensure uptime, performance, resources, and security of computers meet user needs. For example, an IT system administrator may acquire, install and/or upgrade computer components and software, provide routine automation, maintain security policies, troubleshoot technical issues, and provide assistance to users in an IT network. An enlarged user group and a large number of service requests can quickly overload system administrators and prevent immediate troubleshooting and service provisioning.

Cloud provisioning is the allocation of cloud provider resources to a customer when a cloud provider accepts a request from a customer. For example, the cloud provider creates a corresponding number of virtual machines and allocates resources (e.g., application servers, load balancers, network storage, databases, firewalls, IP addresses, virtual or local area networks, etc.) to support application operation. In some examples, a virtual machine is an emulation of a particular computer system that operates based on a particular computer architecture, while functioning as a real or hypothetical computer. Virtual machine implementations may involve specialized hardware, software, or a combination of both. Example virtual machines allow multiple operating system environments to co-exist on the same primary hard drive and support application provisioning. Before example virtual machines and/or resources are provisioned to users, cloud operators and/or administrators determine which virtual machines and/or resources should be provisioned to support applications requested by users.

Infrastructure-as-a-Service (also commonly referred to as IaaS) generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform that gives an application developer access to infrastructure resources, such as virtualized servers, storage, and networking resources. By providing ready access to the hardware resources required to run an application, the cloud computing platform enables developers to build, deploy, and manage projects at a greater scale and at a faster pace than ever before.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

FIG. 1 is an example architecture 100 in which an example virtual imaging appliance (VIA) 116 is utilized to configure and deploy an example virtual server rack 104. The example architecture 100 of FIG. 1 includes a hardware layer 106, a virtualization layer 108, and an operations and management (OAM) component 110. In the illustrated example, the hardware layer 106, the virtualization layer 108, and the operations and management (OAM) component 110 are part of the example virtual server rack 104. The virtual server rack 104 of the illustrated example is based on one or more example physical racks.

Example physical racks are a combination of computing hardware and installed software that may be utilized by a customer to create and/or add to a virtual computing environment. For example, the physical racks may include processing units (e.g., multiple blade servers), network switches to interconnect the processing units and to connect the physical racks with other computing units (e.g., other physical racks in a network environment such as a cloud computing environment), and/or data storage units (e.g., network attached storage, storage area network hardware, etc.). The example physical racks are prepared by the system integrator in a partially configured state to enable the computing devices to be rapidly deployed at a customer location (e.g., in less than 2 hours). For example, the system integrator may install operating systems, drivers, operations software, management software, etc. The installed components may be configured with some system details (e.g., system details to facilitate intercommunication between the components of two or more physical racks) and/or may be prepared with software to collect further information from the customer when the virtual server rack is installed and first powered on by the customer.

The example virtual server rack 104 is configured to configure example physical hardware resources 112, 114 (e.g., physical hardware resources of the one or more physical racks), to virtualize the physical hardware resources 112, 114 into virtual resources, to provision virtual resources for use in providing cloud-based services, and to maintain the physical hardware resources 112, 114 and the virtual resources. The example architecture 100 includes an example virtual imaging appliance (VIA) 116 that communicates with the hardware layer 106 to store operating system (OS) and software images in memory of the hardware layer 106 for use in initializing physical resources needed to configure the virtual server rack 104. In the illustrated example, the VIA 116 retrieves the OS and software images from a virtual system provider image repository 118 via an example network 120 (e.g., the Internet). For example, the VIA 116 is to configure new physical racks for use as virtual server racks (e.g., the virtual server rack 104). That is, whenever a system integrator wishes to configure new hardware (e.g., a new physical rack) for use as a virtual server rack, the system integrator connects the VIA 116 to the new hardware, and the VIA 116 communicates with the virtual system provider image repository 118 to retrieve OS and/or software images needed to configure the new hardware for use as a virtual server rack. In the illustrated example, the OS and/or software images located in the virtual system provider image repository 118 are configured to provide the system integrator with flexibility in selecting to obtain hardware from any of a number of hardware manufacturers. As such, end users can source hardware from multiple hardware manufacturers without needing to develop custom software solutions for each hardware manufacturer. Further details of the example VIA 116 are disclosed in U.S. Patent Application Publication No. 2016/0013974, filed on Jun. 26, 2015, and titled "Methods and Apparatus for Rack Deployments for Virtual Computing Environments," which is hereby incorporated herein by reference in its entirety.

The example hardware layer 106 of FIG. 1 includes an example hardware management system (HMS) 122 that interfaces with the physical hardware resources 112, 114 (e.g., processors, network interface cards, servers, switches, storage devices, peripherals, power supplies, etc.). The HMS 122 is configured to manage individual hardware nodes such as different ones of the physical hardware resources 112, 114. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 104 in a hardware-independent manner. The HMS 122 also supports rack-level boot-up sequencing of the physical hardware resources 112, 114 and provides services such as secure resets, remote resets, and/or hard resets of the physical hardware resources 112, 114.

In the illustrated example of FIG. 1, the hardware layer 106 includes an example HMS monitor 124 to monitor the operational status and health of the HMS 122. The example HMS monitor 124 is an external entity outside of the context of the HMS 122 that detects and remediates failures in the HMS 122. That is, the HMS monitor 124 is a process that runs outside the HMS daemon to monitor the daemon. For example, the HMS monitor 124 can run alongside the HMS 122 in the same management switch as the HMS 122.

The example virtualization layer 108 includes an example virtual rack manager (VRM) 126. The example VRM 126 communicates with the HMS 122 to manage the physical hardware resources 112, 114. The example VRM 126 creates the example virtual server rack 104 out of underlying physical hardware resources 112, 114 that may span one or more physical racks (or smaller units such as a hyper-appliance or half rack) and handles physical management of those resources. The example VRM 126 uses the virtual server rack 104 as a basis of aggregation to create and provide operational views, handle fault domains, and scale to accommodate workload profiles. The example VRM 126 keeps track of available capacity in the virtual server rack 104, maintains a view of a logical pool of virtual resources throughout the SDDC life-cycle, and translates logical resource provisioning to allocation of physical hardware resources 112, 114. The example VRM 126 interfaces with components of a virtual system solutions provider, such as an example VMware vSphere® virtualization infrastructure components suite 128, an example VMware vCenter® virtual infrastructure server 130, an example ESXi™ hypervisor component 132, an example VMware NSX® network virtualization platform 134 (e.g., a network virtualization component or a network virtualizer), an example VMware NSX® network virtualization manager 136, and an example VMware vSAN™ network data storage virtualization component 138 (e.g., a network data storage virtualizer). In the illustrated example, the VRM 126 communicates with these components to manage and present the logical view of underlying resources such as hosts and clusters. The example VRM 126 also uses the logical view for orchestration and provisioning of workloads.

The VMware vSphere® virtualization infrastructure components suite 128 of the illustrated example is a collection of components to setup and manage a virtual infrastructure of servers, networks, and other resources. Example components of the VMware vSphere® virtualization infrastructure components suite 128 include the example VMware vCenter® virtual infrastructure server 130 and the example ESXi™ hypervisor component 132.

The example VMware vCenter® virtual infrastructure server 130 provides centralized management of a virtualization infrastructure (e.g., a VMware vSphere® virtualization infrastructure). For example, the VMware vCenter® virtual infrastructure server 130 provides centralized management of virtualized hosts and virtual machines from a single console to provide IT administrators with access to inspect and manage configurations of components of the virtual infrastructure.

The example ESXi™ hypervisor component 132 is a hypervisor that is installed and runs on servers in the example physical hardware resources 112, 114 to enable the servers to be partitioned into multiple logical servers to create virtual machines.

The example VMware NSX® network virtualization platform 134 (e.g., a network virtualization component or a network virtualizer) virtualizes network resources such as physical hardware switches to provide software-based virtual networks. The example VMware NSX® network virtualization platform 134 enables treating physical network resources (e.g., switches) as a pool of transport capacity. In some examples, the VMware NSX® network virtualization platform 134 also provides network and security services to virtual machines with a policy driven approach.

The example VMware NSX® network virtualization manager 136 manages virtualized network resources such as physical hardware switches to provide software-based virtual networks. In the illustrated example, the VMware NSX® network virtualization manager 136 is a centralized management component of the VMware NSX® network virtualization platform 134 and runs as a virtual appliance on an ESXi host. In the illustrated example, a VMware NSX® network virtualization manager 136 manages a single vCenter server environment implemented using the VMware vCenter® virtual infrastructure server 130. In the illustrated example, the VMware NSX® network virtualization manager 136 is in communication with the VMware vCenter® virtual infrastructure server 130, the ESXi™ hypervisor component 132, and the VMware NSX® network virtualization platform 134.

The example VMware vSAN™ network data storage virtualization component 138 is software-defined storage for use in connection with virtualized environments implemented using the VMware vSphere R virtualization infrastructure components suite 128. The example VMware vSAN™ network data storage virtualization component clusters server-attached hard disk drives (HDDs) and solid state drives (SSDs) to create a shared datastore for use as virtual storage resources in virtual environments.

Although the example VMware vSphere® virtualization infrastructure components suite 128, the example VMware vCenter® virtual infrastructure server 130, the example ESXi™ hypervisor component 132, the example VMware NSX® network virtualization platform 134, the example VMware NSX® network virtualization manager 136, and the example VMware vSAN™ network data storage virtualization component 138 are shown in the illustrated example as implemented using products developed and sold by VMware, Inc., some or all of such components may alternatively be supplied by components with the same or similar features developed and sold by other virtualization component developers.

The virtualization layer 108 of the illustrated example, and its associated components are configured to run virtual machines. However, in other examples, the virtualization layer 108 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 104 of the illustrated example enables abstracting the physical hardware resources 112, 114. In some examples, the virtual server rack 104 includes a set of physical units (e.g., one or more racks) with each unit including physical hardware resources 112, 114 such as server nodes (e.g., compute+storage+network links), network switches, and, optionally, separate storage units. From a user perspective, the example virtual server rack 104 is an aggregated pool of logic resources exposed as one or more vCenter ESXi™ clusters along with a logical storage pool and network connectivity. In examples disclosed herein, a cluster is a server group in a virtual environment. For example, a vCenter ESXi™ cluster is a group of physical servers in the physical hardware resources 112, 114 that run ESXi™ hypervisors (developed and sold by VMware, Inc.) to virtualize processor, memory, storage, and networking resources into logical resources to run multiple virtual machines that run operating systems and applications as if those operating systems and applications were running on physical hardware without an intermediate virtualization layer.

In the illustrated example, the example OAM component 110 is an extension of a VMware vCloud® Automation Center (VCAC) that relies on the VCAC functionality and also leverages utilities such as a cloud management platform (e.g., a vRealize Automation® cloud management platform) 140, Log Insight™ log management service 146, and Hyperic® application management service 148 to deliver a single point of SDDC operations and management. The example OAM component 110 is configured to provide different services such as heat-map service, capacity planner service, maintenance planner service, events and operational view service, and virtual rack application workloads manager service.

In the illustrated example, the vRealize Automation® cloud management platform 140 is a cloud management platform that can be used to build and manage a multi-vendor cloud infrastructure. The vRealize Automation® cloud management platform 140 provides a plurality of services that enable self-provisioning of virtual machines in private and public cloud environments, physical machines (install OEM images), applications, and IT services according to policies defined by administrators. For example, the vRealize Automation® cloud management platform 140 may include a cloud assembly service to create and deploy machines, applications, and services to a cloud infrastructure, a code stream service to provide a continuous integration and delivery tool for software, and a broker service to provide a user interface to non-administrative users to develop and build templates for the cloud infrastructure when administrators do not need full access for building and developing such templates. The example vRealize Automation® cloud management platform 140 may include a plurality of other services, not described herein, to facilitate building and managing the multi-vendor cloud infrastructure. In some examples, the example vRealize Automation® cloud management platform 140 may be offered as an on-premise (e.g., on-prem) software solution wherein the vRealize Automation® cloud management platform 140 is provided to an example customer to run on the customer servers and customer hardware. In other examples, the example vRealize Automation® cloud management platform 140 may be offered as a Software as a Service (e.g., SaaS) wherein at least one instance of the vRealize Automation® cloud management platform 140 is deployed on a cloud provider (e.g., Amazon Web Services).

In the illustrated example, a heat map service of the OAM component 110 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM component 110 checks against available resources and looks for potential bottlenecks before deployment of an application workload. The example capacity planner service also integrates additional rack units in the collection/stack when capacity is expanded.

In the illustrated example, the maintenance planner service of the OAM component 110 dynamically triggers a set of logical operations to relocate virtual machines (VMs) before starting maintenance on a hardware component to increase the likelihood of substantially little or no downtime. The example maintenance planner service of the OAM component 110 creates a snapshot of the existing state before starting maintenance on an application. The example maintenance planner service of the OAM component 110 automates software upgrade/maintenance by creating clones of machines, upgrading software on clones, pausing running machines, and attaching clones to a network. The example maintenance planner service of the OAM component 110 also performs rollbacks if upgrades are not successful.

In the illustrated example, an events and operational views service of the OAM component 110 provides a single dashboard for logs by feeding to a Log Insight™ log management service 146. The example events and operational views service of the OAM component 110 also correlates events from the heat map service against logs (e.g., a server starts to overheat, connections start to drop, lots of HTTP/503 from App servers). The example events and operational views service of the OAM component 110 also creates a business operations view (e.g., a top down view from Application Workloads=>Logical Resource View=>Physical Resource View). The example events and operational views service of the OAM component 110 also provides a logical operations view (e.g., a bottom up view from Physical resource view=>vCenter ESXi Cluster View=>VM's view).

In the illustrated example, the virtual rack application workloads manager service of the OAM component 110 uses vCAC and vCAC enterprise services to deploy applications to vSphere hosts. The example virtual rack application workloads manager service of the OAM component 110 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM component 110 optimizes applications and virtual storage area network (vSAN) arrays to have high data resiliency and the best possible performance achievable at the same time.

In the illustrated example of FIG. 1, the architecture 100 includes example VPZ generation circuitry 150. The example VPZ generation circuitry 150 is a component of the vRealize Automation® cloud management platform 140. The example VPZ generation circuitry 150 is in communication with provisioning circuitry 160 (e.g., a provisioning engine) and in communication with the example vRealize API 144. The example VPZ generation circuitry 150 generates and allocates virtual private zones (VPZs) in a multi-tenant environment instantiated by the vRealize Automation® cloud management platform 140. For example, the VPZ generation circuitry 150 is implemented by an application (e.g., executed by processor circuitry, etc.) that enables a user (e.g., a service provider) to bundle cloud infrastructure resources as a virtual private zone and allocate (e.g., share) the virtual private zone to a first tenant. The example VPZ generation circuitry 150 is described in further detail below in connection with FIG. 4.

The example provisioning circuitry 160 is to provision the cloud infrastructure resources that were selected by the VPZ generation circuitry 150. The example provisioning circuitry 160 provisions the cloud infrastructure resources based on a cloud account (e.g., the cloud account used by the service provider) or a virtual private zone identifier (e.g., vpzLink) which is included in the cloud infrastructure resources selected (e.g., bundled).

Although the example VCAC, the example vRealize Automation® cloud management platform 140, the example Log Insight™ log management service 146, the example Hyperic® application management service 148, and the example VPZ generation circuitry 150 are shown in the illustrated example as implemented using products developed and sold by VMware, Inc., some or all of such components may alternatively be supplied by components with the same or similar features developed and sold by other virtualization component developers. For example, the utilities leveraged by the cloud automation center may be any type of cloud computing platform and/or cloud management platform that delivers and/or provides management of the virtual and physical components of the architecture 100.

Figure 2:
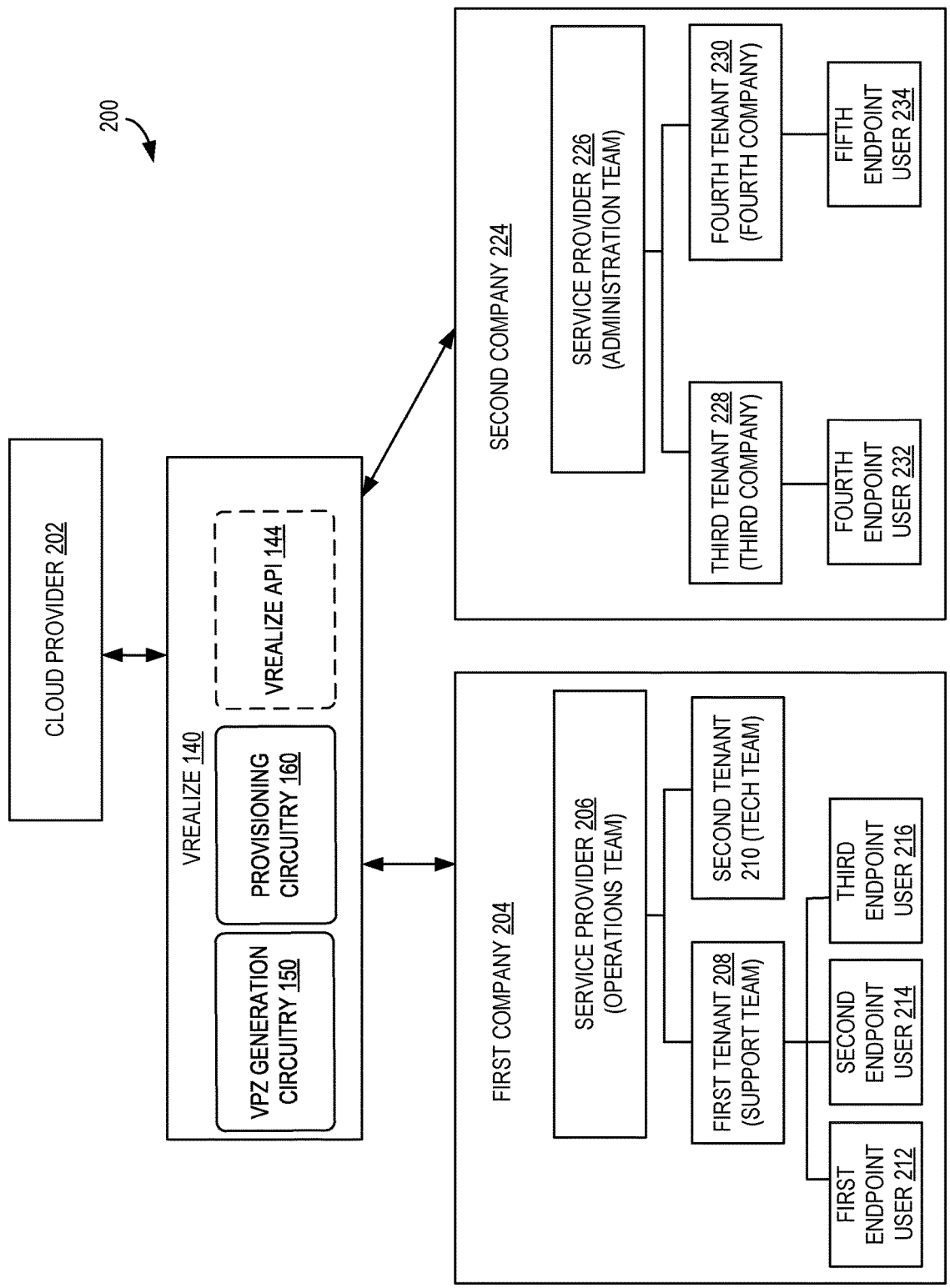
FIG. 2 is a network diagram (e.g., system-level diagram) illustrating the cloud provider in communication with multiple tenants of a first service provider and multiple tenants of a second service provider to provide a virtual private zone (VPZ) to the tenants.

FIG. 2 is a network level environment 200 illustrating an example cloud provider 202 offering the cloud infrastructure service such as the vRealize Automation® cloud management platform 140 which is in communication with an example first company 204 and an example second company 224. The example first company 204 includes an example service provider 206, an example first tenant 208 (e.g., the support team), and an example second tenant 210 (e.g., the technology team). The example first tenant 208 includes an example first endpoint user 212, an example second endpoint user 214, and an example third endpoint user 216.

The example second company 224 includes an example service provider 226 (e.g., the administration team), an example third tenant 228 (e.g., an example third company), and an example fourth tenant 230 (e.g., an example forth company). The example third tenant 228 includes an example fourth endpoint user 232. The example fourth tenant 230 includes an example fifth endpoint user 234. In the example of FIG. 2, there are two companies in communication with the example vRealize Automation® cloud management platform 140. However, in other examples, any number of companies may be in communication with the example vRealize Automation® cloud management platform 140. In some examples, the example first company 204 and the example second company 224 are in communication with the example vRealize Automation® cloud management platform 140 by accessing the example vRealize API 144.

The example cloud provider 202 is to provision workloads. Examples of the cloud provider 202 include VMware vSphere, Microsoft Azure, Amazon Web Services (AWS), Google Cloud Platform, etc. In some examples, Google Cloud platform, AWS, and Azure are public clouds. In some examples, the example VMware NSX® network virtualization platform 134 (FIG. 1) (e.g., a network virtualization component or a network virtualizer) and the example VMware vSphere cloud computing platform are private clouds. The example cloud provider 202 includes cloud infrastructure resources for bundling based on services offered by the cloud provider 202. For example, a service provider 206 for the first company 204 may use a Google Cloud Platform account which determines that the cloud infrastructure resources bundled in the virtual private zone are Google Cloud Platform infrastructure resources. The example service provider 206 may use Microsoft Azure as the cloud provider 202, which determines that the cloud infrastructure resources bundled are Microsoft Azure infrastructure resources. In some examples, different infrastructure resources are available based on the specific cloud provider 202 that the service provider 206 uses in the generation of the virtual private zone.

In some examples in which the example vRealize Automation® cloud management platform 140 is offered as a Software as a Service (e.g., SaaS), and at least one instance of the vRealize Automation® cloud management platform 140 is deployed on a first cloud provider (e.g., Amazon Web Services), the example service provider 206 may use a second cloud provider (e.g., Google Cloud Platform) for the cloud infrastructure resources in generating the virtual private zone. In such examples, the example service provider 206 may use the second cloud provider (e.g., Google Cloud Platform) by providing the credentials (e.g., login data) for the second cloud provider account and then provisioning workloads on the second cloud provider. In some examples, the example service provider 206 may access the cloud provider public API to use the cloud infrastructure resources of the second cloud provider.

The example first company 204 conducts business by utilizing virtual machines in order to develop and support applications which are used by consumers. In some examples, the example first company 204 pays to rent the infrastructure as a service hosted by the example cloud provider 202. The example first company 204 includes internal teams which are assigned to different projects (e.g., providing user support, developing applications) which use virtual machines that may include different virtual operating systems and cloud infrastructure resources.

In the example of FIG. 2, the example service provider 206 is the operations team. The operations team is to assign (e.g., allocate, provision) different infrastructure resources to different tenants. The operations team manages the technology team and the support team. For example, the service provider 206 is in communication with the example cloud provider 202 and the example vRealize Automation® cloud management platform 140 in order to provide the example cloud infrastructure to the tenants of the example service provider 206. In the example first company 204, the first tenant 208 and the second tenant 210 are internal teams for the example first company 204.

The example service provider 206 (e.g., operations team) uses a virtual private zone (VPZ) to select cloud infrastructure resources to provide to the tenants. For example, the example service provider 206 may select to provide first cloud infrastructure resources as a support virtual private zone to the example first tenant 208 (e.g., the support team) and restrict the second tenant 210 (e.g., the technology team) from accessing the support virtual private zone constructed of first cloud infrastructure resources. The example service provider 206 uses a virtual private zone (VPZ) to not show the tenants the underlying cloud entries nor the credentials for the underlying provider (e.g., vSphere accounts, AWS keys, Azure keys, etc.).

In the example of FIG. 2, the example first tenant 208 is the support team. In some examples, the first tenant 208 (e.g., the support team) answers consumer questions regarding the application. In some examples, the first company 204 has distributed an application to consumers which is designed to run on a Windows® operating system. In these examples, the example support team may use virtual machines provisioned with a Windows® operating system in order to generate the application in a similar Windows® environment the consumer is using.

In the example of FIG. 2, the example second tenant 210 is the technology team. In some examples, the second tenant 210 (e.g., the technology team) develops applications which are used by consumers. The technology team may design new features and upgrades to the applications of the example first company 204. The virtual machines that the example technology team uses may include different cloud infrastructure resources than the virtual machines of the example support team. In some examples, the applications are developed with virtual machines that use Ubuntu® or Linux® as the operating system.

The example service provider 206, the example first tenant 208, and the example second tenant 210 are different organizations in cloud assembly (e.g., the cloud assembly architecture). In some examples, the example service provider 206 may allocate the support virtual private zone (VPZ) (e.g., the support VPZ 504 of FIG. 5) to the example first tenant 208, and then switch the allocation from the example first tenant 208 to the example second tenant 210. After switching the allocation, the example first tenant 208 is unable to access the virtual private zone.

The example first tenant 208 (e.g., the support team) includes three endpoint users (e.g., first endpoint user 212, second endpoint user 214, and third endpoint user 216, etc.) who use the provisioned virtual machines for support work such as answering consumer questions and trouble-shooting.

The example service provider 226 of the second company 224 may be an administration team which negotiates with other companies to instantiate virtual machines on the platform of the second company. For example, the third tenant 228 may be a third company that is separate from the second company 224 and the fourth tenant 230 (e.g., a fourth company). In the example of FIG. 2, the example third tenant 228 is not an internal team such as the first tenant 208 of the example first company 204. As a result, the example fourth tenant 230 (e.g., the fourth company) may be allocated cloud infrastructure resources which are not allocated (e.g., not switched) to the example third tenant 228.

Figure 3:
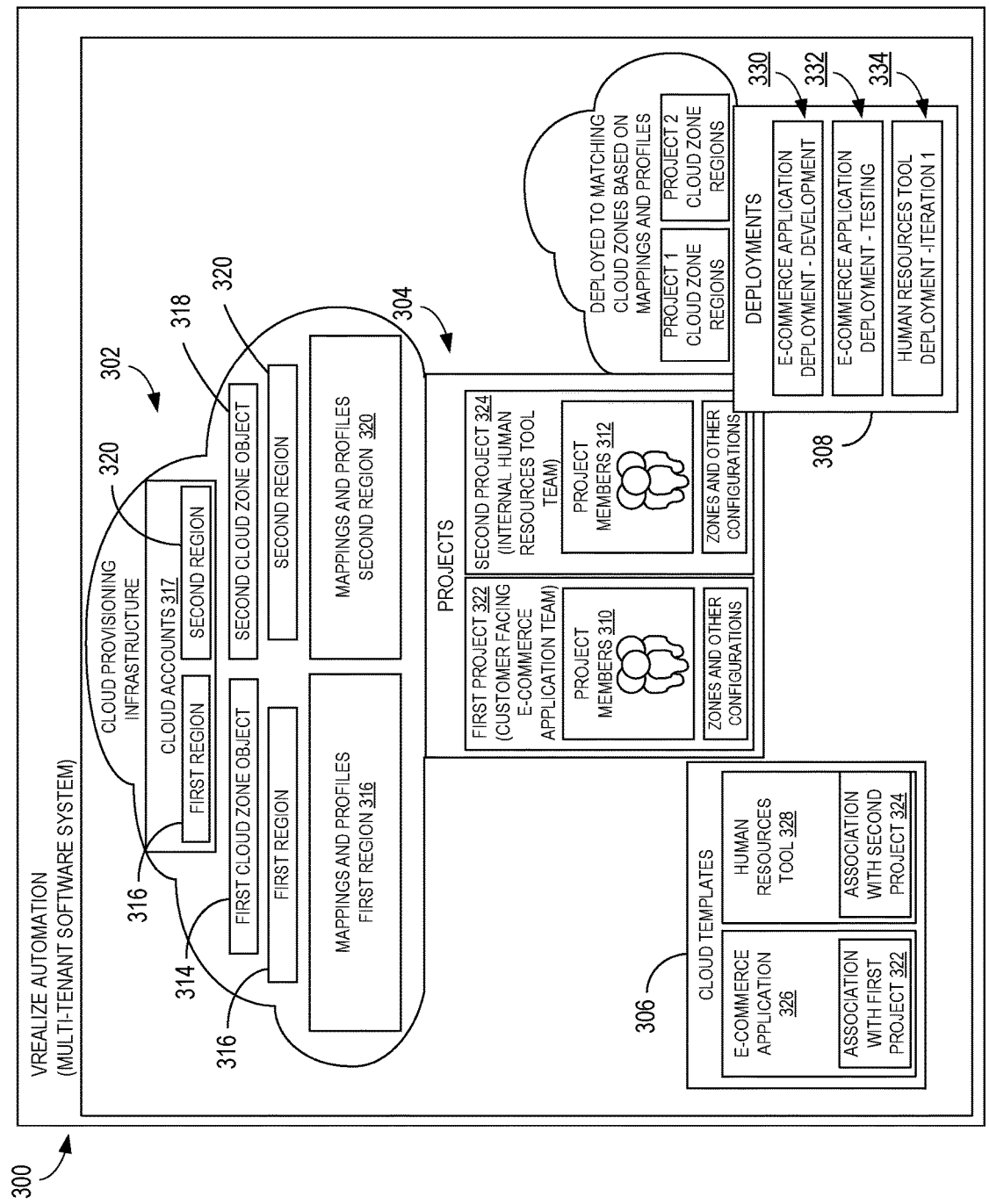
FIG. 3 is an illustration of a cloud provisioning infrastructure, projects, cloud templates, and deployments.

FIG. 3 illustrates the example components of the vRealize automation which is a multi-tenant software system 300 (e.g., vRealize Automation). The example multi-tenant software system 300 includes a cloud provisioning infrastructure 302, projects 304, cloud templates 306, and deployments 308.

The example cloud provisioning infrastructure 302 includes a cloud account (e.g., one of the cloud accounts 317 of FIG. 3) selected by the example service provider 206 of FIG. 2. For example, the cloud provisioning infrastructure 302 is personalized in response to the cloud account selected by the example service provider 206 of FIG. 2. For example, the service provider 206 may select a first cloud provider (e.g., Google Cloud Platform), or a second cloud provider (e.g., Microsoft Azure). The example cloud accounts 317 are connected to a first region 316 and a second region 320. For example, the first region 316 (e.g., first datacenter) may be a region (e.g., datacenter) such as Europe-West-1, or Europe-West-3, or Europe-North.

The example cloud provisioning infrastructure 302 includes cloud zone objects. For example, in the example of FIG. 3, the cloud provisioning infrastructure 302 includes a first cloud zone object 314 which is associated with the example first region 316 and the second cloud zone object 318 which is associated with the example second region 320 (however, the service provider 206 of FIG. 2 is not limited in the number of cloud zones). The cloud zone objects access the mappings (e.g., image mappings, instance type mappings) and profiles (e.g., storage profiles, network profiles) of the associated region. For example, the first region 316 may include a first image (e.g., an operating system), while the second region 320 may include a second image (e.g., an operating system). The first cloud zone object 314 is to access the first image as the first cloud zone object 314 is provisioned in the example first region 316. In the illustrated example, the first cloud zone object 314 has no connection to the other cloud infrastructure resources (e.g., image type mapping, instance type mapping, network profile, storage profile), as such other cloud infrastructure resources are determined by the cloud account. For example, the first cloud zone object 314 may be a cloud zone object, and the example second cloud zone object 318 may be a virtual private zone. For example, if the example second cloud zone object 318 is a virtual private zone, the example second cloud zone object 318 is associated with the second region 320 and is assigned some of the computes (e.g., vCenter clusters, availability zones) of the second region 320, but may access cloud infrastructure resources provided to the second cloud zone object 318. In some examples, if the second cloud zone object 318 is a virtual private zone, the second cloud zone object 318 has a connection to (e.g., may access) at least one image type mapping, instance type mapping, network profile and storage profile that have been selected by the example service provider 206 of FIG. 2.

The example projects 304 include a first project 322 which includes project members 310 and has associated cloud zones and configurations (e.g., mappings and profiles). For example, the first project 322 includes the first cloud zone object 314 and the mappings and profiles of the first region 316. The example projects 304 includes a second project 324 which includes project members 312 and has associated cloud zones and configurations (e.g., mappings and profiles). The example service provider 206 of FIG. 2 is to determine the endpoint users that are the example project members 310, 312.

The example cloud templates 306 include templates that are associated with (e.g., linked to) the projects 304. The example e-commerce application template 326 is associated with the first project 322 and the example human resources tool template 328 is associated with the second project 324. In some examples, the example service provider 206 (FIG. 2) may define the amount of storage (e.g., 100 GB of storage) in the example cloud templates 306. The example cloud templates 306 include restrictions of a maximum instances count, a maximum CPU, a maximum memory, and a maximum storage used. The example runtime may be verified based on whether the requested amount is available based on a project defined quota and the available resources of the example cloud provider 202 (FIG. 2). The example cloud templates 306 are unaware of the example virtual private zones (e.g., the example second cloud zone object 318). When customers (e.g., the service provider 206 of FIG. 2, the first tenant 208 of FIG. 2) deploy cloud templates 306 through the vRealize® cloud management platform 140 of FIGS. 1 and 2, the example cloud provider 202 of FIG. 2 provides at least some part of example virtual server rack 104 for customers to use. That is, the customers "receive" (e.g., access) the example hardware layer 106 of FIG. 1 and the example virtualization layer 108 of FIG. 1. However, the example OAM component 110 (e.g., the applications and software of the operations and management component 110) includes software requested (e.g., selected, chosen) by the customer in the cloud template, but the example OAM component 110 does not include the vRealize® cloud management platform 140 itself.

The example deployments 308 include the development e-commerce application deployment 330, the testing e-commerce application deployment 332, and the first iteration human resources tool deployment 334. The example deployments 308 are deployed to matching cloud zones based on the mappings and profiles. For example, the development e-commerce application deployment 330 (which is based on the example e-commerce application template 326) is deployed in the first region 316. The example deployments 308 are accessible by consumers, and the example cloud templates 306 are accessible by developers. The example cloud templates 306 may be accessed in a cloud zone (e.g., the first cloud zone object 314) by users with a cloud account. The example cloud templates 306 may be accessed in a virtual private zone by users without a cloud account. The example virtual private zone may be directly allocated to tenants. In some examples, the tenants do not have access to a cloud account.

Figure 4:
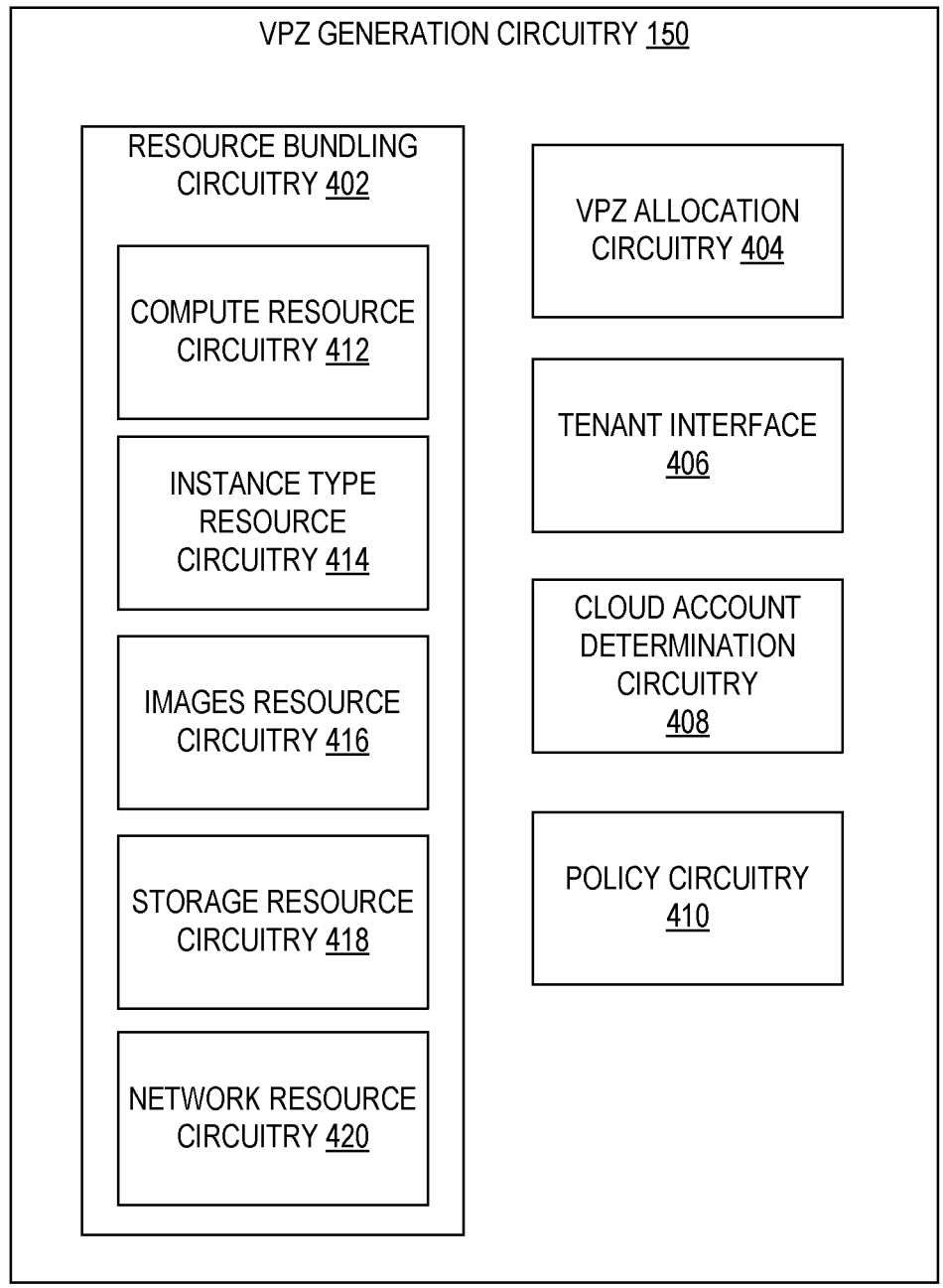
FIG. 4 is a block diagram of example virtual private zone (VPZ) generation circuitry.

FIG. 4 is a block diagram of the example VPZ generation circuitry 150. The example VPZ generation circuitry 150 generates virtual private zones (VPZ). A VPZ is a type of cloud zone object. As used herein, a cloud zone object is an object instantiated by the cloud servers to represent a logical private zone of resources, services, and/or information/data accessible only by authorized users. The example VPZ generation circuitry 150 includes example resource bundling circuitry 402, example VPZ allocation circuitry 404, an example tenant interface 406, cloud account determination circuitry 408, and policy circuitry 410. The example resource bundling circuitry 402 includes example compute resource circuitry 412, example instance type resource circuitry 414, example images resource circuitry 416, example storage resource circuitry 418, and example network resource circuitry 420.

The example resource bundling circuitry 402 is to determine cloud infrastructure resources and bundle the cloud infrastructure resources as a virtual private zone. The example resource bundling circuitry 402 may select the cloud infrastructure resources based on input by a user (e.g., the service provider 206 of FIG. 2). For example, the example service provider 206 (e.g., the operations team) of FIG. 2 may build a first virtual private zone with an image type with the Windows® operating system which may be used by the first tenant 208 (e.g., the support team) of FIG. 2. As used herein, example cloud infrastructure resources include compute resources, storage resources, network resources, image mappings and instance type mappings. As used herein, an image mapping is the operating system that is provisioned to an example virtual machine in an example virtual private zone. As used herein, an instance type mapping is the number of central processing units (CPU) and amount of random access memory (RAM) that are provisioned to a virtual machine.

The example compute resource circuitry 412 is to bundle a compute resource which is a cloud infrastructure resource. As used herein, a compute resource (sometimes shown as "compute") refers to a cloud infrastructure resource or an object that represents a host, host cluster, or pool in a virtualization platform, a virtual datacenter, or an Amazon Web Services (AWS) region on which machines may be provisioned. For example, in a vSphere (vCenter) infrastructure, a compute resource may be an ESX or ESXi host or cluster. For example, in a Hyper-V (SCVMM) infrastructure, a compute resource may be a Hyper-V host. For example, in a vCloud Director infrastructure, a compute resource may be a virtual datacenter. For example, in an Amazon AWS infrastructure, a compute resource may be an AWS region. The example compute resource circuitry 412 bundles the compute resource by determining that a first cluster in a first datacenter is provisioned to a first virtual private zone as illustrated in FIG. 7B.

The example instance type resource circuitry 414 is to bundle the instance type mappings resource which is a cloud infrastructure resource. As used herein, an instance type mapping resource refers to a flavor resource. In some examples, some cloud providers (e.g., Amazon Web Services) refer to this cloud infrastructure resource as "flavors," while other cloud providers (e.g., VMware, Google Cloud Platform, Microsoft Azure, etc.) refer to this cloud infrastructure resource as an "instance type mapping." As used herein, the flavor (e.g., an instance type mapping) is the number of central processing units (CPU) and amount of random access memory (RAM) that are provisioned to a virtual machine. For example, a medium flavor may include four ("4") CPUs and eight ("8") gigabytes of RAM as illustrated in FIG. 7C. An example first virtual private zone may include at least one flavor (e.g., an instance type mapping). The example service provider 206 (FIG. 2) may determine that endpoint users may require to provision a first virtual machine with a medium flavor, and a second virtual machine with a second flavor that has more RAM. In some examples, the example virtual private zone may obscure (e.g., hide, prevent access) the specific amount of RAM and number of CPUs in each flavor (e.g., instance type mapping) selected (e.g., bundled) by the example service provider 206 of FIG. 2 to the example first tenant 208 of FIG. 2. For example, the example first tenant 208 (e.g., support team) may be able to provision "medium"-flavored virtual machines and "large"-flavored virtual machines in the virtual private zone but be prevented by the virtual private zone from determining that the medium-flavored virtual machines have 4 CPUs and 8 gigabytes of RAM, and that the large-flavored virtual machines have 8 CPUs and 16 gigabytes of RAM.

The example images resource circuitry 416 is to bundle the image type mappings resource which is a cloud infrastructure resource. As used herein, the image mappings resource is the operating system that is provisioned to the example virtual machine in the example virtual private zone. For example, the service provider 206 of FIG. 2 bundles infrastructure resources as virtual private zones which are allocated to either the first tenant 208 of FIG. 2 or the example second tenant 210 of FIG. 2. In the example of FIG. 2, the example first tenant 208 is a support team which may require the image resource to be a Windows® operating system, while the example second tenant 210 is a technology team that builds applications and requires the image resource to be a Linux® operating system. The example images resource circuitry 416 is to bundle the selected image type to the virtual private zone. As described in FIG. 7D, the example service provider 206 of FIG. 2, may select a specific version of the image type (e.g., operating system), but may name the image type generically. For example, the image type name 724 of FIG. 7D is "CENTOS", while the first image type version 720 of FIG. 7D is "CENTOS-7-X64-Minimal" and the second image type version 722 of FIG. 7D is "CENTOS8-GUI." The example first tenant 208 of FIG. 2 is prevented from accessing the specific image type version (e.g., the first image type version 720 of FIG. 7D, the second image type version 722 of FIG. 7D), but may access the assigned image type name 724 of FIG. 7D provided by the example service provider 206 of FIG. 2. The tenant is prevented from accessing the underlying cloud infrastructure resources. The tenant may know the virtual machine will be provisioned with a Linux® OS image or Windows® OS image, or any other image type, but does not know the specific underlying cloud infrastructure resource.

The example storage resource circuitry 418 is to bundle the storage resource which is a cloud infrastructure resource. As used herein, the storage resources define the location (e.g., datacenter, cluster) to store the virtual machine files, the disk type, the provisioning type, and the shares. In the example of FIG. 7E, the provisioning type is "thin," and the number of shares is "low" (e.g., five hundred shares). In some examples, the thick provisioning type is for production environments and the thin provisioning type is for evaluation and testing. In some examples, the storage resources (e.g., storage profile) defines the upper bound for Input/Output Per Second (IOPS). In some examples, the storage resources (e.g., storage profile) determine whether deployed disks that are associated with the storage resources (e.g., storage profile) support encryption.

The example network resource circuitry 420 is to bundle the network resource which is a cloud infrastructure resource. As used herein, the network resource determines how the virtual machines access the Internet. The networks are used in provisioning to existing, on-demand, or public networks. The networks are related to an account (e.g., a region). In the example of FIG. 7F, the network is named "Net-89" and is in the account (e.g., the region) VCenter/DataCenter. In some examples, Dynamic Host Configuration Protocol (DHCP) may be enabled on all network interfaces. In some examples, the example service provider 206 of FIG. 2 uses standard network settings and selects the network ranges that the tenants are able to access. Networks may be inside or outside the enterprise network.

The example VPZ allocation circuitry 404 is to allocate the example virtual private zone to an example tenant. For example, after the example service provider 206 of FIG. 2 bundles cloud infrastructure resources (e.g., image profile, instance type, network profile, storage profile) to generate a first virtual private zone with the example resource bundling circuitry 402, the example service provider 206 of FIG. 2 uses the example VPZ allocation circuitry 404 to allocate (e.g., share) the first virtual private zone (e.g., the support VPZ 504 of FIG. 5) to the example first tenant 208 of FIG. 2. The example first tenant 208 of FIG. 2 is able to access the first virtual private zone and provision virtual machines based on the bundled cloud infrastructure resources.

In some examples, the example service provider 206 of FIG. 2 may decide to switch the allocation of the first virtual private zone (e.g., the support VPZ 504 of FIG. 5) from the example first tenant 208 of FIG. 2 to the example second tenant 210 of FIG. 2. In such examples, the first tenant 208 of FIG. 2 loses access to the first virtual private zone, and the second tenant 210 of FIG. 2 is able to provision virtual machines according to the bundled cloud infrastructure resources. In some examples, the example VPZ allocation circuitry 404 uses a tenant identification key (e.g., TenantOrgId) to determine the tenant that has been allocated the first virtual private zone.

The example tenant interface 406 is to alert the tenant when a new virtual private zone has been allocated to the tenant. For example, the example tenant interface 406 may send an electronic communication (e.g., an email) to the example tenant after the example service provider allocates the virtual private zone to the tenant. In some examples, the tenant interface 406 alerts the tenant after access to the virtual private zone has been removed. The tenant sees the VPZ when generating a project. For example, the tenant may access the projects tab, and a virtual private zone may be available for use.

The example cloud account determination circuitry 408 determines if the example service provider 206 of FIG. 2 has a cloud account. In response to the service provider 206 not having a cloud account, the example cloud account determination circuitry 408 prompts the service provider 206 to obtain a cloud account. In response to the service provider 206 having a cloud account, the cloud account determination circuitry 408 accesses the cloud infrastructure resources specific to the cloud account. For example, if the example service provider has a Google Cloud Platform account, the cloud infrastructure resources are Google Cloud Platform infrastructure resources. In some examples, the accounts (e.g., accounts registered with datacenters) for provisioning are specific to the specific cloud provider, and Google Cloud Platform may have access to a Windows® 7 operating system resource and a Windows® 8 operating system resource, but not a Windows® 10 operating system resource, while Microsoft Azure may have access to all three operating system resources.

The example policy circuitry 410 is to obscure the underlying infrastructure resources. An example policy specifies that a tenant is not authorized to access underlying cloud infrastructure resources bundled in a virtual private zone. For example, the tenant may access information specifying that the operating system name is "CENTOS", but not access that it is "CENTOS-7-x64-MINIMAL" (e.g., cannot access version information such as version number, version identifier, etc.) In some examples, the policy circuitry 410 may allow different levels of privacy and obfuscation based on protocols set forth by the example service provider 206 of FIG. 2. In some examples, the policy circuitry 410 includes a customer toggle (e.g., company toggle) which determines the level of privacy and obfuscation. For example, a first customer or service provider 206 of FIG. 2 may determine that the virtual private zone (e.g., the support VPZ 504 of FIG. 5) does not need to hide the underlying cloud infrastructure resources, and the example customer toggle is set to allow example tenants to access information about the underlying cloud infrastructure resources in the virtual private zone.

Figure 5:
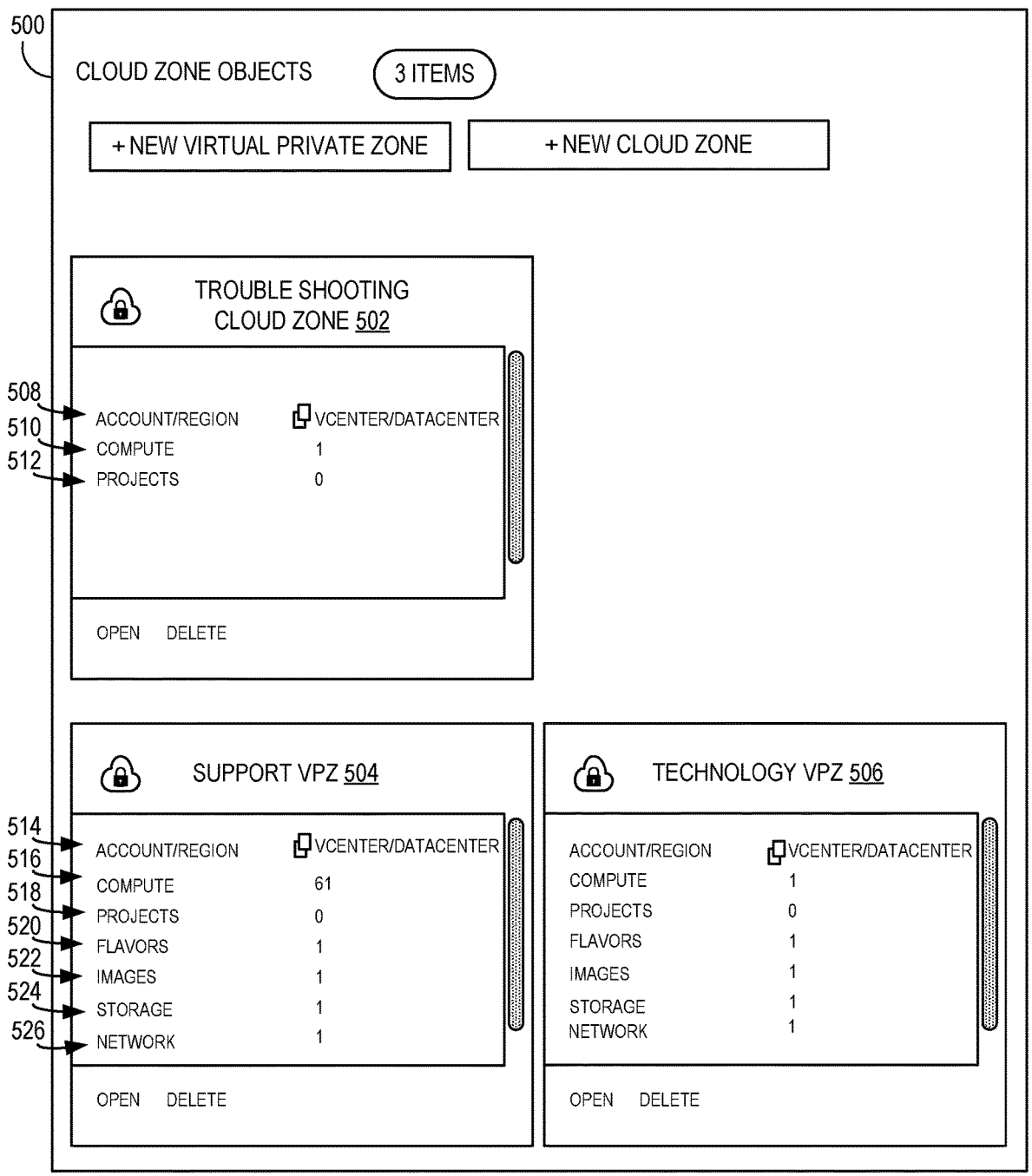
FIG. 5 is an illustration of a cloud zone object and multiple virtual private zones.

FIG. 5 is an example dashboard 500 showing three example cloud zone objects. The first cloud zone object is an example cloud zone (e.g., troubleshooting cloud zone 502). The second cloud zone object is an example first virtual private zone (e.g., support VPZ 504). The third cloud zone object is an example technology VPZ 506. For example, the example service provider 206 of FIG. 2 accesses the three cloud zone objects (e.g., the troubleshooting cloud zone 502, the support VPZ 504, the technology VPZ 506) in the dashboard 500. The example cloud zone objects 502, 504, 506 include an account field, a compute resource field, and projects field. Other cloud infrastructure resources (e.g., flavors, images, storage, and network) are determined during provisioning and are based on the account (e.g., region) that the troubleshooting cloud zone 502 is assigned. For example, a cloud zone object may be assigned to the European West Datacenter-1, and the image type mapping (e.g., operating system) available in the European West Datacenter-1 is Ubuntu®, so the cloud zone object uses Ubuntu® as the image type mapping.

The example virtual private zones include all the cloud infrastructure resources, which are linked to the specific VPZ based on the virtual private zone identifier (e.g., vpzLink, vpzId). During provisioning of a VPZ (e.g., one of the VPZs 504, 506), the provisioning circuitry 160 (FIG. 1) checks (e.g., accesses) the virtual private zone identifier, which when populated, points to the specific VPZ. The provisioning circuitry 160 then bundles the cloud infrastructure resources selected (e.g., marked for bundling) for the VPZ by the example service provider 206 of FIG. 2.

In the example of FIG. 5, the example troubleshooting cloud zone 502 includes a first account/region field 508, a first compute resource field 510, and first projects field 512. Other cloud infrastructure resources (e.g., instance type mappings, images, storage, and network) are determined during provisioning based on the example first account/region field 508. The example troubleshooting cloud zone 502 is accessible by an authorized user having a cloud account. However, the example troubleshooting cloud zone 502 is unable to be allocated to a tenant because the example troubleshooting cloud zone 502 is not a virtual private zone.

In the example of FIG. 5, the example support VPZ 504, includes an account (e.g., region) field 514, a compute resource field 516, a projects field 518, an instance type mapping resource field 520, an images (e.g., image type mapping) resource field 522, a storage profile resource field 524, and a network profile resource field 526. The example compute resource field 516 is used to specify the compute resource. The example instance type mapping resource field 520 is used to specify the instance type resource (e.g., instance type mapping). The images resource field 522 is used to specify the images resource (e.g., the image type mapping). The storage profile resource field 524 is used to specify the storage resource. The network profile resource field 526 is used to specify the network resource.

The example service provider 206 of FIG. 2 may explicitly determine which cloud infrastructure resources are bundled to the support VPZ 504. If the example service provider 206 of FIG. 2 is designing a virtual private zone for the second tenant 210 of FIG. 2 (e.g., the support team), the virtual private zone may include an image mapping typically used by support staff (e.g., Windows®) and a small flavor (e.g., 4 gigabytes of RAM). The example service provider 206 of FIG. 2 is unable to select the specific cloud infrastructure resources for the example troubleshooting cloud zone 502 because the specific cloud infrastructure resources are selected based on the account (e.g., region) where the example troubleshooting cloud zone 502 is provisioned.

Figure 6A:
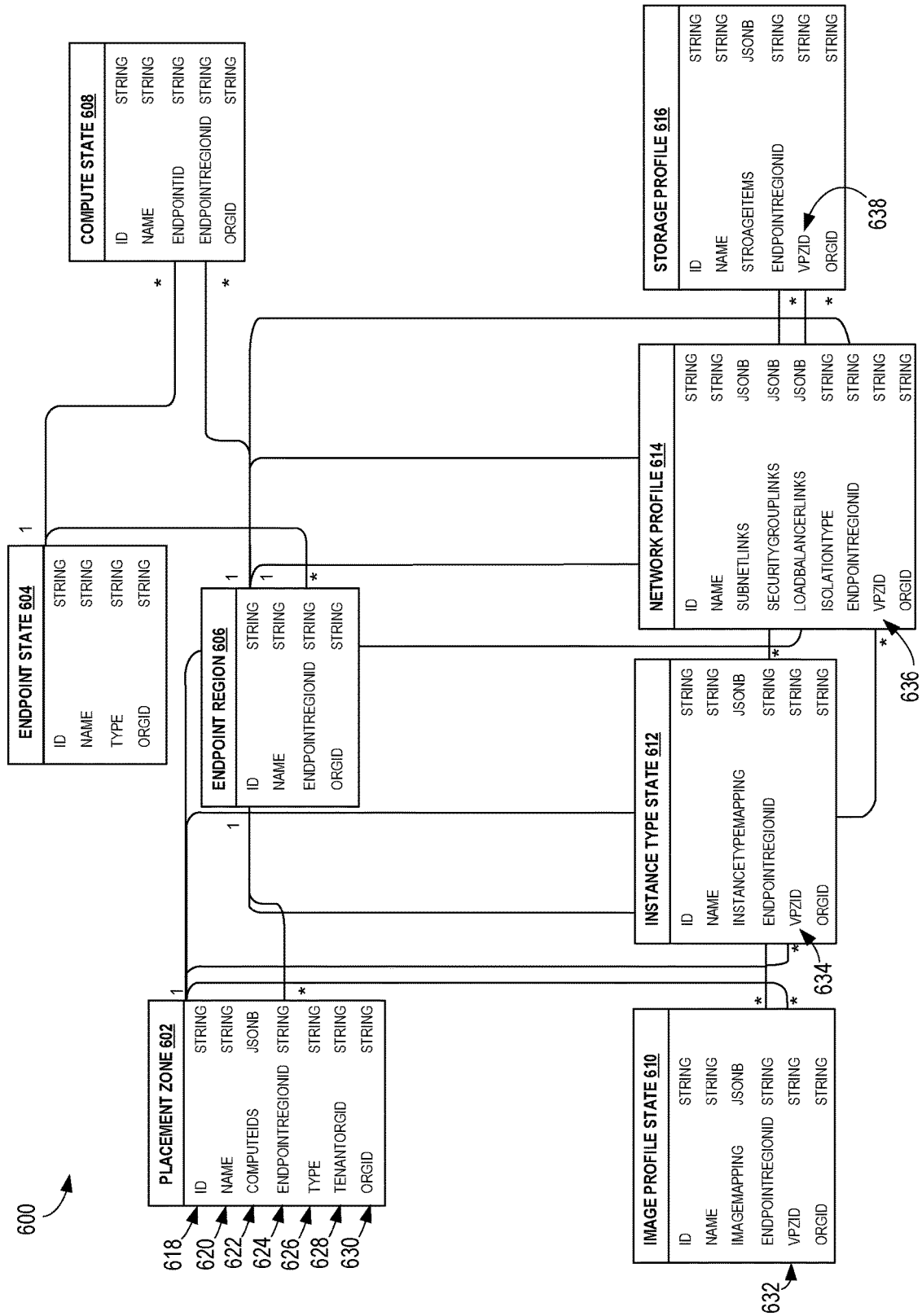
FIG. 6A is an illustration of an example data chart to implement a virtual private zone.

FIG. 6A is a database diagram 600 of the example cloud zone objects 502, 504, 506 of FIG. 5. The example database diagram 600 includes eight distinct tables such as the example placement zone table 602 (e.g., PlacementZone), the example endpoint state table 604 (e.g., EndpointState), the example endpoint region table 606 (e.g., EndpointRegion), the example compute state table 608 (e.g., ComputeState), the example image profile state table 610 (e.g., ImageProfileState), the example instance type state table 612 (e.g., InstanceTypeState), the example network profile table 614 (e.g., NetworkProfile), and the example storage profile table 616 (e.g., StorageProfile).

The example database diagram 600 includes some one-to-many relationships as shown by instances of the number 1 which represents "one" and instances of the asterisk symbol, *, which represents "many."

The example placement zone table 602 includes configuration information for example cloud zone objects. For example, the example troubleshooting cloud zone 502 of FIG. 5, the example support VPZ 504 of FIG. 5, and the example technology VPZ 506 of FIG. 5 are represented in the example placement zone table 602. The example placement zone table 602 includes an identification field 618, a name field 620, a compute identification field 622, an endpoint region identification field 624, a type field 626, a tenant organization identification field 628, and an organization identification field 630. The example troubleshooting cloud zone 502 of FIG. 5 as represented in the database diagram of 600 has the name "Troubleshooting Cloud Zone" for the name field 620. The example troubleshooting cloud zone 502 of FIG. 5 as represented in the database diagram 600 includes an account (e.g., region, Europe-West-1, datacenter) for the endpoint region identification field 624.

The example troubleshooting cloud zone 502 of FIG. 5 does not include values for the example type field 626, the example tenant organization identification field 628 or the example organization field 630, as the example troubleshooting cloud zone 502 of FIG. 5 is unable to be allocated to a specific tenant. That is, the troubleshooting cloud zone 502 is not allocatable to a tenant because the troubleshooting cloud zone 502 is not a virtual private zone and the other cloud infrastructure resources are associated directly to the region that the troubleshooting cloud zone 502 is provisioned. The other cloud infrastructure resources are not explicitly allocated to the troubleshooting cloud zone 502. In the example database diagram 600 of FIG. 6A, the endpoint region identification field 624 associates the placement zone 602 for a cloud zone object with the other cloud infrastructure resources. The other cloud infrastructure resources include an image profile shown in the image profile state table 610, an instance type shown in the instance type state table 612, a network profile shown in the network profile table 614, and a storage profile shown in the storage profile table 616. However, other cloud infrastructure resources for a virtual private zone are determined based on the virtual private zone identification field 632 as illustrated in the example image profile state table 610.

A virtual private zone identifier is present in the other cloud infrastructure resources. For example, the virtual private zone identification field 632 (e.g., vpzId) is provided in the image profile state table 610, and the virtual private zone identification field 634 is provided in the instance type state table 612. The virtual private zone identification field 636 is provided in the network profile table 614 and the virtual private zone identification field 638 is provided in the storage profile table 616. The example support virtual private zone 504 of FIG. 5 may be represented in the database diagram 600 by the example placement zone table 602. The example support virtual private zone 504 of FIG. 5 includes a name (Support VPZ) and an endpoint region (account/region), and a type based on the type field 626 wherein the type is "Virtual Private Zone", while prior techniques do not provide a type for a cloud zone. The virtual private zone includes a tenant organization identification in the example tenant organization identification field 628. For example, the example VPZ allocation circuitry 404 may allocate the virtual private zone to a first tenant (e.g., the support team of FIG. 2) and later, in response to a determination from the service provider 206, switch the allocation from the first tenant to the second tenant. The example VPZ allocation circuitry 404 may switch the value in the tenant organization identification field 628 to switch the allocation of the virtual private zone.

As used herein, the endpoint state represents the cloud account that the example service provider 206 of FIG. 2 accesses in order to start provisioning. For example, a Google Cloud Platform generates different cloud infrastructure resources than Microsoft Azure, while both cloud providers include at least an Internet connection.

FIG. 6B shows example machine readable instructions 650 to instantiate the database diagram 600 of FIG. 6A. The example instructions of FIG. 6B show how a virtual private zone is based on the bundled cloud infrastructure resources which are to be allocated to different tenants and how cloud zones are based on the endpoint region for the cloud infrastructure resources. The example of FIG. 6B shows instructions to instantiate data structures to represent corresponding ones of the example placement zone table 602 of FIG. 6A, the example endpoint state table 604 of FIG. 6A, the example endpoint region table 606 of FIG. 6A, and the example compute state table 608. The data structure format is shown as the name of the field followed by the type of the field. For example, the compute identification field 622 is a JSONB file and is shown as such in FIG. 6B at reference number 660, and the tenant organization identification field 628 of FIG. 6A is a string and is shown as such in FIG. 6B at reference number 670.

FIGS. 7A-7F illustrate example user interfaces showing information used by the example service provider 206 of FIG. 2 to bundle cloud infrastructure resources. The example user interfaces of FIGS. 7A-7F are generated by the example VPZ generation circuitry 150 of FIG. 4. The example resource bundling circuitry 402 (FIG. 4) bundles an example virtual private zone in response to an input of the example service provider 206 of FIG. 2.

Figure 7A:
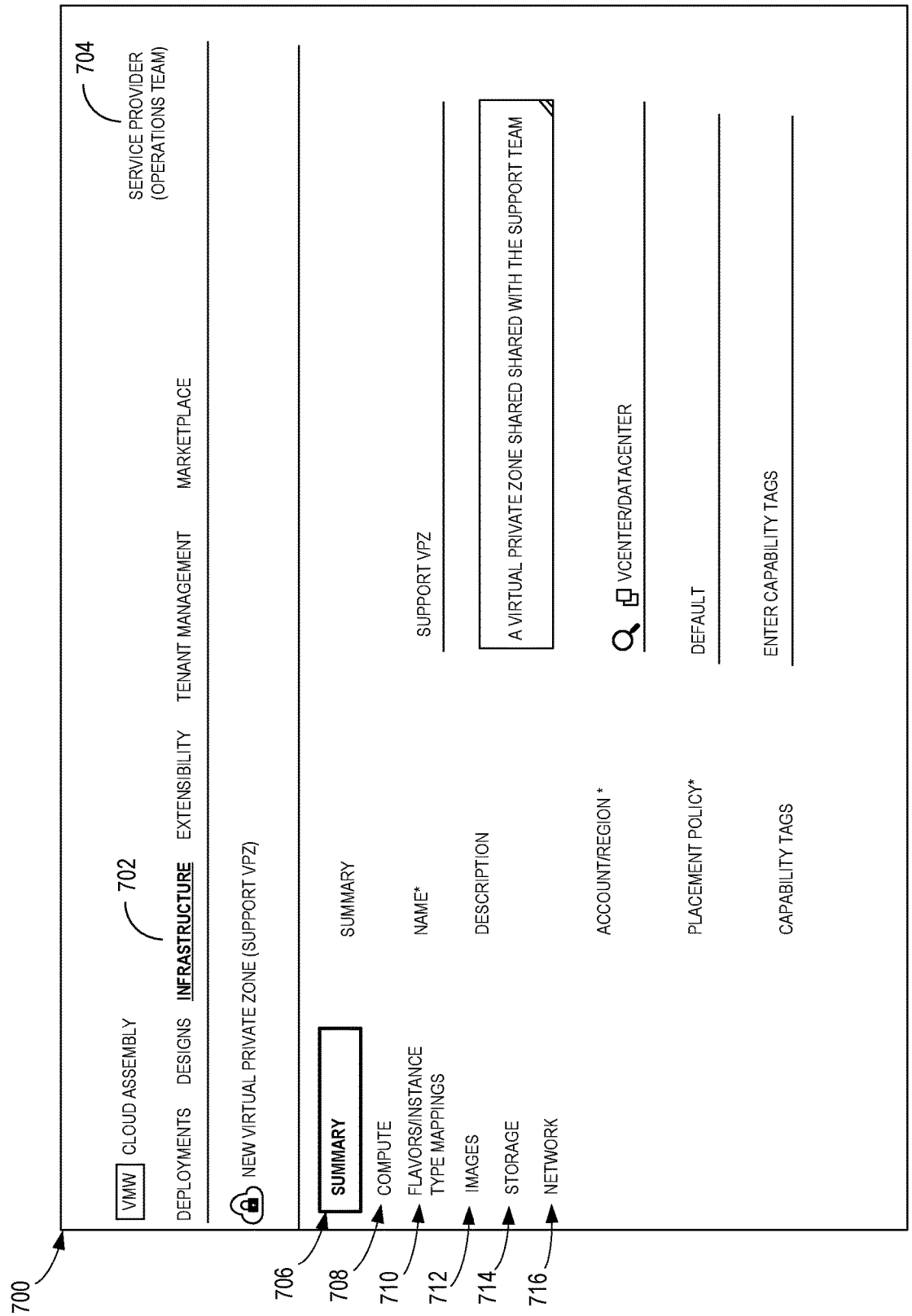
FIG. 7A is an illustration of a user interface to bundle cloud infrastructure resources to build a virtual private zone.
Figure 7B:
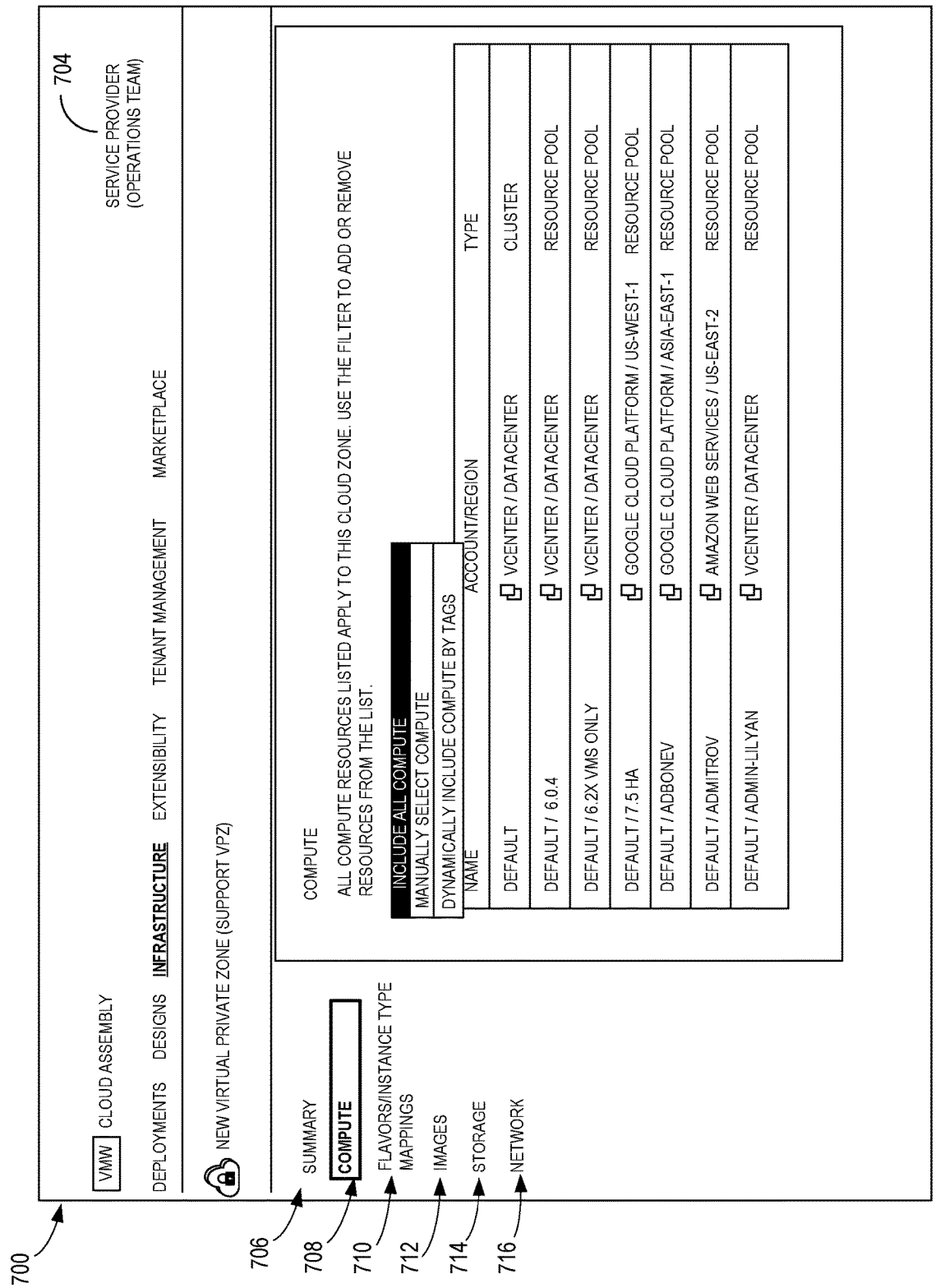
FIG. 7B is an illustration of a user interface to bundle compute resources to build a virtual private zone.
Figure 7C:
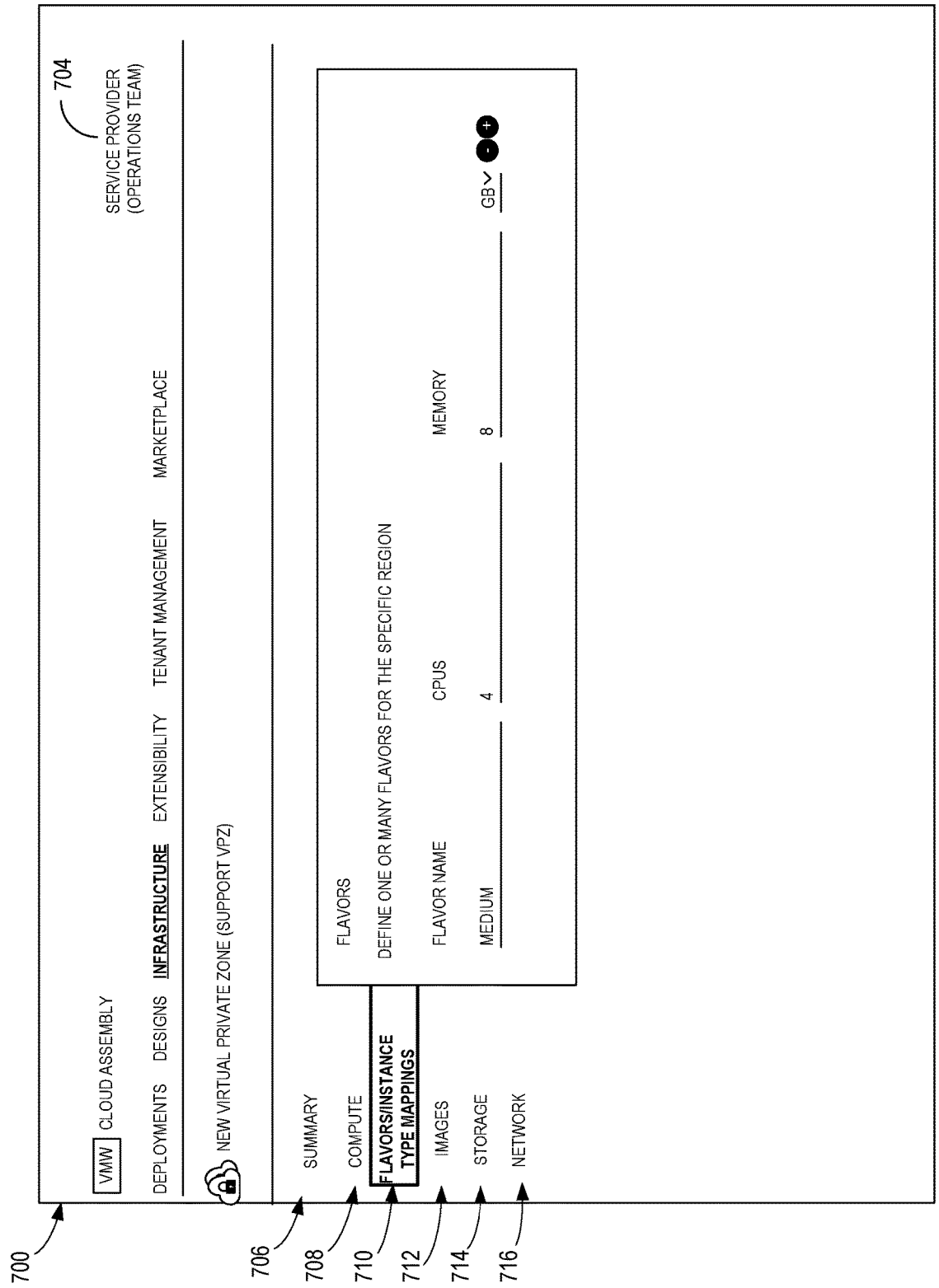
FIG. 7C is an illustration of a user interface to bundle instance type resources to build a virtual private zone.
Figure 7D:
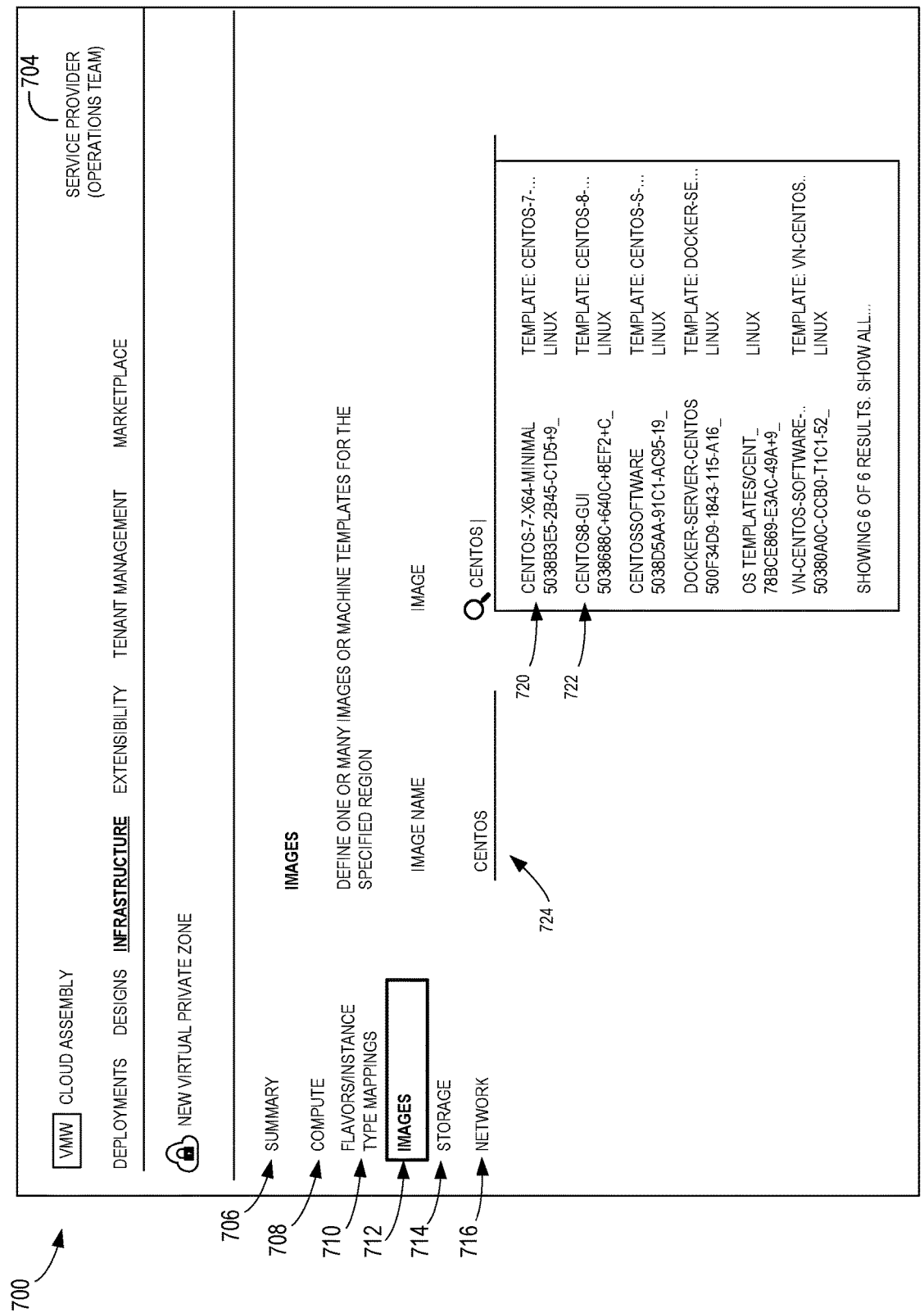
FIG. 7D is an illustration of a user interface to bundle image type resources to build a virtual private zone.
Figure 7E:
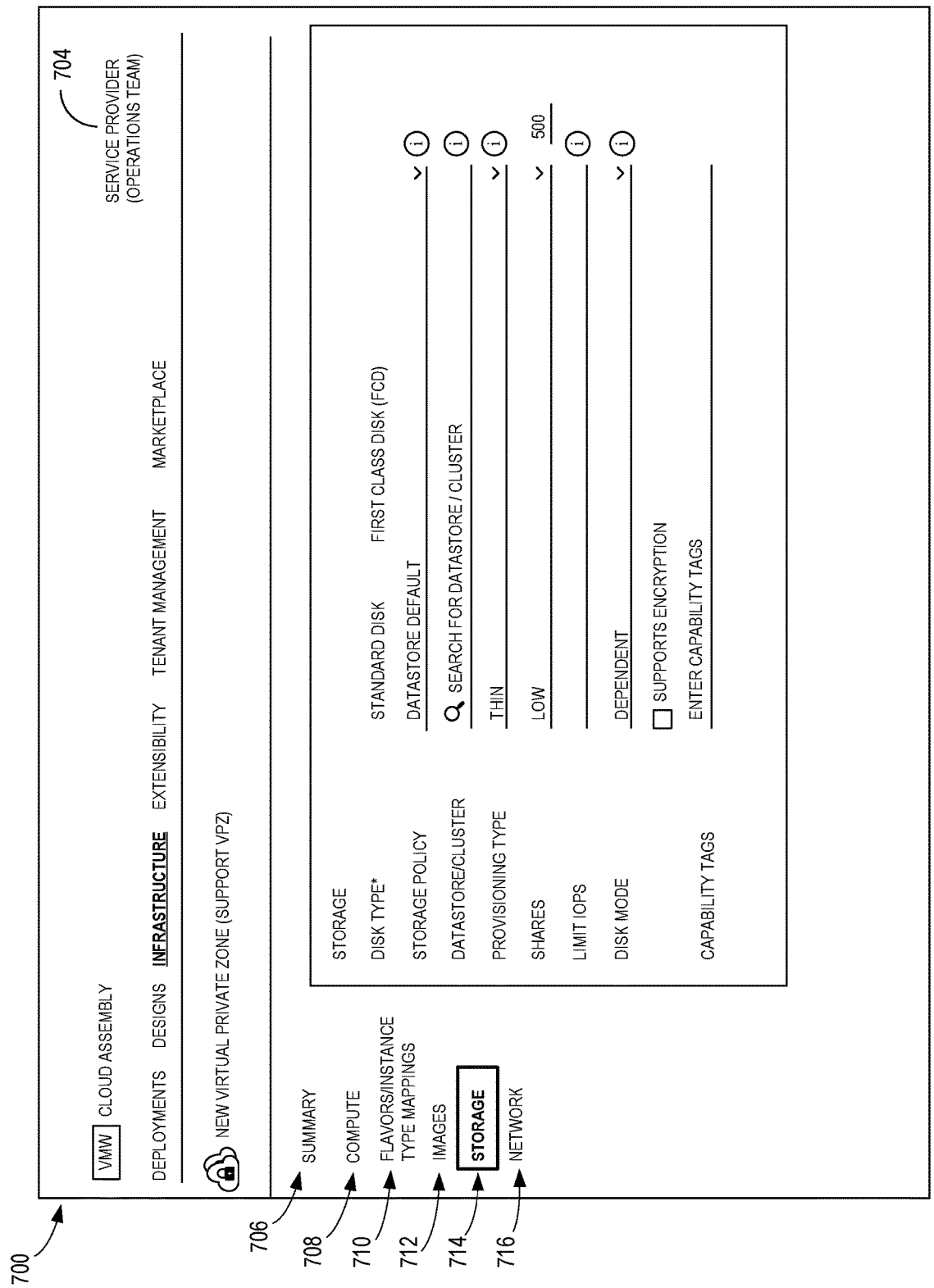
FIG. 7E is an illustration of a user interface to bundle storage profile resources to build a virtual private zone.
Figure 7F:
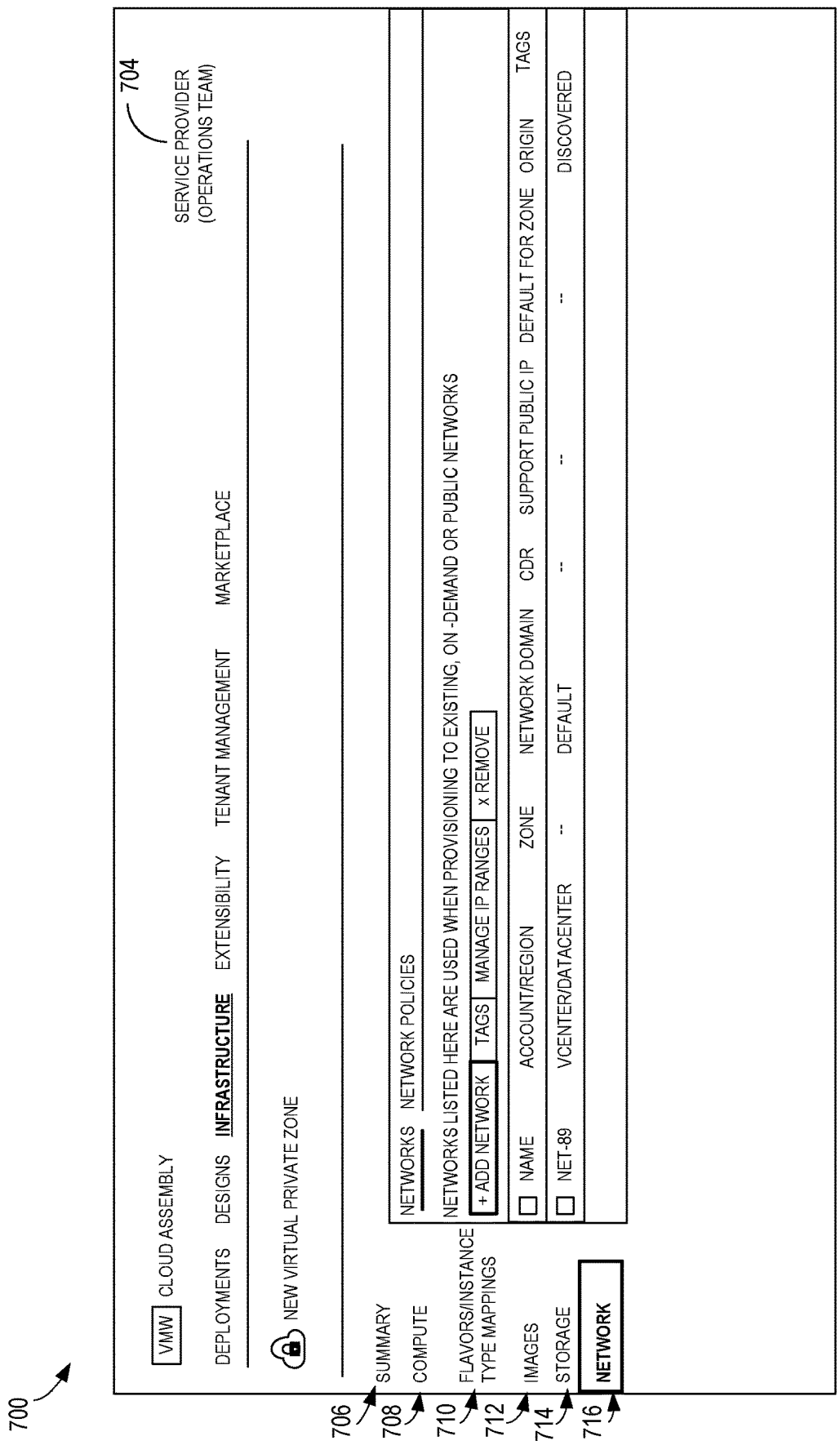
FIG. 7F is an illustration of a user interface to bundle network profile resources to build a virtual private zone.

FIG. 7A is an example summary graphical user interface (GUI) of an example virtual private zone (e.g., the support VPZ 504 of FIG. 5). The example user interface 700 of FIG. 7A includes an infrastructurecategory 702 which includes the cloud infrastructure resources that are bundled. The example user interface 700 includes an account name 704, and in the example of FIG. 7A, the example account is the service provider 206 of FIG. 2, which bundles the cloud infrastructure resources.

The example infrastructure category 702 includes six selectable configuration categories, such as a summary configuration category 706, a compute configuration category 708, an instance type mappings configuration category 710, an images (e.g., image type mappings) configuration category 712, a storage profiles configuration category 714, and a network profiles configuration category 716. The example summary configuration category 706 includes the name of the virtual private zone, a description, and an account/region for the virtual private zones. The account (e.g., region) in the example of FIG. 7A is the example vCenter. The example service provider 206 of FIG. 2 selects the cloud infrastructure resources, rather than being confined to the cloud infrastructure resources being selected by the account/region.

FIG. 7B illustrates an example GUI screen for the example compute configuration category 708 of the user interface 700. The example compute configuration category 708 includes the compute resources which the example service provider 206 (e.g., the operations team) of FIG. 2 may select to bundle into an example virtual private zone. The example service provider 206 may select an option to include all compute resources, select an option to manually select specific compute resources, or select an option to dynamically include compute resources by tags. In the example of FIG. 7B, the service provider 206 of FIG. 2 selects to include all the compute resources. The example compute resources include a column for a name (e.g., default, Default/7.5HA, Default/ADBONEV, etc.), a column for an account or region (e.g., VCenter/Datacenter, Google Cloud Platform/US-West-1, Amazon Web Services/US-East-2), and a type (e.g., cluster, resource pool).

FIG. 7C illustrates an example GUI screen for the example instance type mappings configuration category 710. The example instance type mappings configuration category 710 illustrates the example instance type mappings (e.g., flavors) by specifying the central processing units and memory for an example instance of a virtual machine. In the example of FIG. 7C, the medium flavor includes four (4) CPUs and eight (8) gigabytes of memory (e.g., random access memory (RAM)). The example flavors of the virtual private zone may be named "small," "medium," or "large" in response to the CPUs and amount of memory the example service provider 206 selects. In some examples, a small flavor may be used for a first type of virtual machine, utilized by a first tenant such as the support team, while the medium flavor may be used for a second type of virtual machine, utilized by a second tenant such as the technology team. The example instance type resource circuitry 414 bundles the instance type mappings to the virtual private zone.

FIG. 7D illustrates an example GUI screen for the example images configuration category 712. The example images configuration category 712 is to select the operating system based on the input of the example service provider 206 of FIG. 2. The example images configuration category 712 includes an image type name 724 and a search bar for the example service provider 206 of FIG. 2 to select the specific image (e.g., image type mapping, operating system). In the example of FIG. 7D, the example service provider 206 selects a first image type version 720 (e.g., CENTOS-7-X64-Minimal), and does not select a second image type version 722 (e.g., CENTOS8-GUI). The example first image type version 720 is included in the example technology VPZ 506 of FIG. 5, and when virtual machines are provisioned in response to the example tenant activating a virtual machine, the virtual machines will use the first image type version 720. The example tenant may access that the image of the virtual private zone is generally "CENTOS" as described by the example image type name 724, while the underlying cloud infrastructure resource is obscured from the example tenant. In some examples, the example policy circuitry 410 uses the example images resource circuitry 416 to obscure the underlying cloud infrastructure resources. The example resource bundling circuitry 402 is to bundle the image OS with a privacy filter with which the service provider 206 is to determine which image OS is selected, while the tenant is unable to determine the specific image OS detected in the VPZ.

FIG. 7E illustrates an example GUI screen for the example storage profiles configuration category 714. The example storage profiles configuration category 714 allows the example resource bundling circuitry 402 to determine the provisioning type (e.g., thick, thin), and the number of shares (e.g., unspecified, low, normal, high, custom). In some examples, a selection of "low" for the number of shares results in five hundred (500) shares. In some examples, the storage may support encryption.

FIG. 7F illustrates an example GUI screen for the example network profiles configuration category 716. The example network profiles configuration category 716 allows the example resource bundling circuitry 402 to determine the network (e.g., the Internet). In the example of FIG. 7F, "Net-89" is selected as the network. The example virtual machines in the VPZ that are instantiated by the provisioning circuitry 160 will be connected to the Internet through example network "Net-89". The network includes an account/region selected as VCenter/Datacenter.

Figure 8:
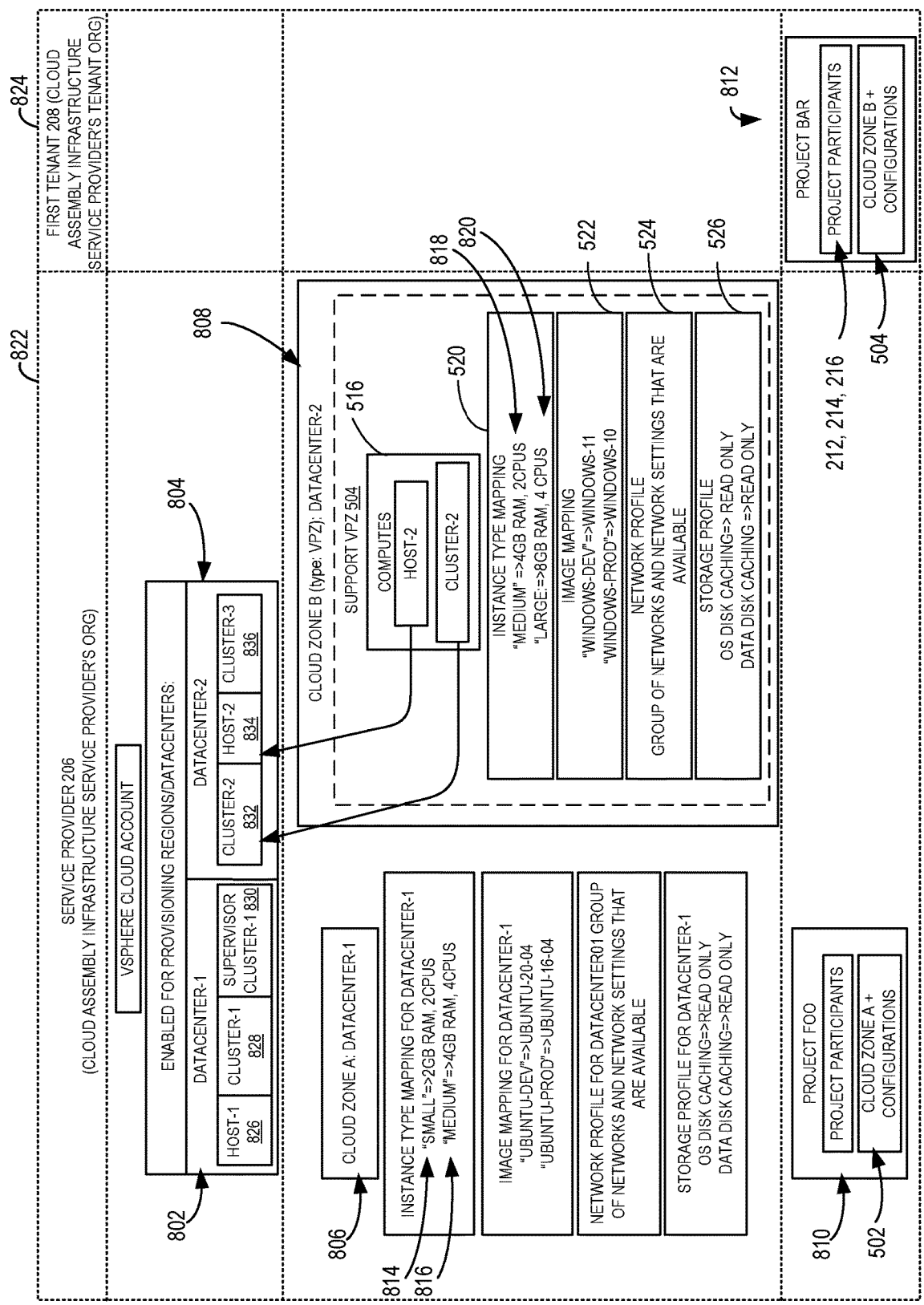
FIG. 8 is an illustration of a cloud zone provisioned to a datacenter and a virtual private zone provisioned to a second datacenter.

FIG. 8 is an example of logical boundaries of an example VPZ in relation to an example structure of an example company. FIG. 8 includes a first column 822 which represents objects accessible by the example service provider 206 of FIG. 2 (e.g., the cloud assembly infrastructure service provider's organization) and a second column 824 which represents objects accessibly by the example first tenant 208 of FIG. 2 (e.g., cloud assembly infrastructure service provider's tenant organization.

The example service provider 206 has access to a cloud account, a first datacenter 802, a second datacenter 804, a first cloud zone objects 806, a second cloud zone object 808, and a first project 810. The example first tenant 208 has access to a second project 812 which includes the second cloud zone object 808 (e.g., the support VPZ 504) allocated to the example first tenant 208 by the example service provider 206.

The example service provider 206 uses an example vSphere Cloud Account to access cloud infrastructure resources. In the example of FIG. 8, the example service provider 206 generates two cloud zone objects. The first cloud zone object 806 is a first cloud zone (e.g., Cloud Zone A) that is provisioned to the first datacenter 802 (e.g., Datacenter-1). The example second cloud zone object 808 is a virtual private zone (e.g., Cloud Zone B (type: VPZ), the support VPZ 504 of FIG. 5) that is provisioned to the second datacenter 804.

For example, the first datacenter 802 may be located in Europe, while the example second datacenter 804 is located in Asia. The example first datacenter 802 includes a first host 826, a first cluster 828, and a first supervisor cluster 830 which are able to be used as compute resources. The example first cloud zone object 806 is provisioned to the first datacenter 802 and uses at least one of the example first host 826, the example first cluster 828, and the example first supervisor cluster 830 as compute resources. The example second datacenter 804 includes a second cluster 832, a second host 834, and a third cluster 836 which may be used as the compute resources based on the example service provider 206. The example second cloud zone object 808 is provisioned to the second datacenter 804, and the example first tenant 208 may decide which of the compute resources provisioned to the second datacenter 804 the second cloud zone object 808 uses.

In the example of FIG. 8, the first cloud zone object 806 is provisioned in the first datacenter 802, and other cloud infrastructure resources (e.g., instance type mapping, image type mapping, network profile, and storage profile) are based on the first datacenter 802. For example, the first datacenter 802 includes two options for the instance type mapping. The first option is a small flavor 814 (e.g., small instance type mapping) which provisions two gigabytes (GB) of RAM and two CPUs for the virtual machines. The second option is a medium flavor 816 (e.g., medium instance type mapping) which provisions four gigabytes of RAM and four CPUs for the virtual machines. In the example of FIG. 8, the example first cloud zone object 806 (e.g., Cloud Zone A), the example cloud assembly infrastructure service provider's organization 850 can only select either the small flavor 814 or the medium flavor 816, as the small flavor 814 and the medium flavor 816 are set by the example first datacenter 802.

In the example of FIG. 8, the example second cloud zone object 808 is the example support virtual private zone 504 of FIG. 5. The example cloud infrastructure resources of the example support virtual private zone 504 include the compute resource (e.g., specified by the compute resource field 516 of FIG. 5) which includes the example second host 834 and the example second cluster 832 which are provisioned in the example second datacenter 804. The other cloud infrastructure resources (e.g., instance type mapping specified by the instance type mapping resource field 520, image type mapping specified by the images resource field 522, storage profile specified by the storage profile resource field 524, and network profile specified by the network profile resource field 526) are selected by the example service provider 206 through the resource bundling circuitry 402 of FIG. 4. For example, the resource bundling circuitry 402 of FIG. 4 uses the example instance type resource circuitry 414 to generate a medium flavor 818 (e.g., medium instance type mapping) which provisions four gigabytes of RAM and two CPUs for the virtual machines and a large flavor 820 (e.g., large instance type mapping) which provisions eight gigabytes of RAM and four CPUs for the virtual machines. The example instance type resource circuitry 414 is to generate the flavor based on the input of the example cloud assembly infrastructure service provider's organization 850 and not the datacenter the virtual private zone is provisioned in. For example, the example cloud assembly infrastructure service provider's organization 850 is to customize the example flavors as shown in the example user interface 700 of FIG. 7C.

FIG. 8 includes an example first project 810 (e.g., project FOO) which is accessible by the example cloud assembly infrastructure service provider's organization 850. The example first project 810 includes project participants and the first cloud zone object 806 (e.g., Cloud Zone A). The example first cloud zone object 806 is accessible based on the access to the cloud account (e.g., vSphere Cloud Account).

In FIG. 8, the example first tenant 208 does not include a cloud account. However, the example first tenant 208 is authorized to access an example second project 812 (e.g., project BAR). The example second project 812 includes project participants (e.g., the first endpoint user 212, the second endpoint user 214, and the third endpoint user 216 of FIG. 2) and the second cloud zone object 808. The example second cloud zone object 808 (e.g., the example support VPZ 504) has been allocated to the example first tenant 208 by the example service provider 206. For example, the example service provider 206 uses the example VPZ allocation circuitry 404 to allocate the example support virtual private zone 504 to the example first tenant 208. The example VPZ allocation circuitry 404 may allocate the example support virtual private zone 504 by assigning the organization identification (e.g., tenant organization identification field 628 of FIG. 6A) for the example tenant (e.g., the example first tenant 208) to allocate the example support virtual private zone 504 to the example tenant.

In some examples, apparatus disclosed herein includes means for selecting at least two cloud infrastructure resources to bundle as a first virtual private zone. For example, the means for selecting may be implemented by resource bundling circuitry 402. In some examples, the means for selecting may be implemented by machine executable instructions such as that implemented by at least blocks 906 of FIG. 9 and 1002 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the resource bundling circuitry 402 is implemented by other hardware logic circuitry, hardware implemented state machines, and/or any other combination of hardware, software, and/or firmware. For example, the resource bundling circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include means for provisioning the cloud infrastructure resources. For example, the means for provisioning may be implemented by provisioning circuitry 160. In some examples, the means for provisioning may be implemented by machine executable instructions such as that implemented by at least blocks 916 of
FIGS. 9 and 1004 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the provisioning circuitry 160 is implemented by other hardware logic circuitry, hardware implemented state machines, and/or any other combination of hardware, software, and/or firmware. For example, the provisioning circuitry 160 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include means for allocating the first virtual private zone to a first tenant. For example, the means for allocating may be implemented by virtual private zone allocation circuitry 404. In some examples, the means for allocating may be implemented by machine executable instructions such as that implemented by at least blocks 1006, 1008, 1010, 1012 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the virtual private zone allocation circuitry 404 is implemented by other hardware logic circuitry, hardware implemented state machines, and/or any other combination of hardware, software, and/or firmware. For example, the virtual private zone allocation circuitry 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the one of more apparatus to implement the vRealize® cloud management platform 140 of FIG. 1 is illustrated in FIGS. 1, 2, and 4, one or more of the elements, processes, and/or devices illustrated in FIGS. 1, 2, and 4 may be combined, divided, re-arranged, omitted, eliminated, and/or implemented in any other way. Further, t the example resource bundling circuitry 402, the example VPZ allocation circuitry 404, the example tenant interface 406, the cloud account determination circuitry 408, the policy circuitry 410, the example compute resource circuitry 412, the example instance type resource circuitry 414, the example images resource circuitry 416, the example storage resource circuitry 418, the example network resource circuitry 420, the example provisioning circuitry 160, and/or, more generally, the example VPZ generation circuitry 150 of FIGS. 1, 2, and 4, may be implemented by hardware alone or by hardware in combination with software and/or firmware. Thus, for example, any of the example resource bundling circuitry 402, the example VPZ allocation circuitry 404, the example tenant interface 406, the cloud account determination circuitry 408, the policy circuitry 410, the example compute resource circuitry 412, the example instance type resource circuitry 414, the example images resource circuitry 416, the example storage resource circuitry 418, the example network resource circuitry 420, the example provisioning circuitry 160, and/or, more generally, the example VPZ generation circuitry 150, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example VPZ generation circuitry 150 of FIGS. 1, 2, and 4 may include one or more elements, processes, and/or devices in addition to, or instead of, those illustrated in FIGS. 1, 2, and 4, and/or may include more than one of any or all of the illustrated elements, processes and devices.

Figure 9:
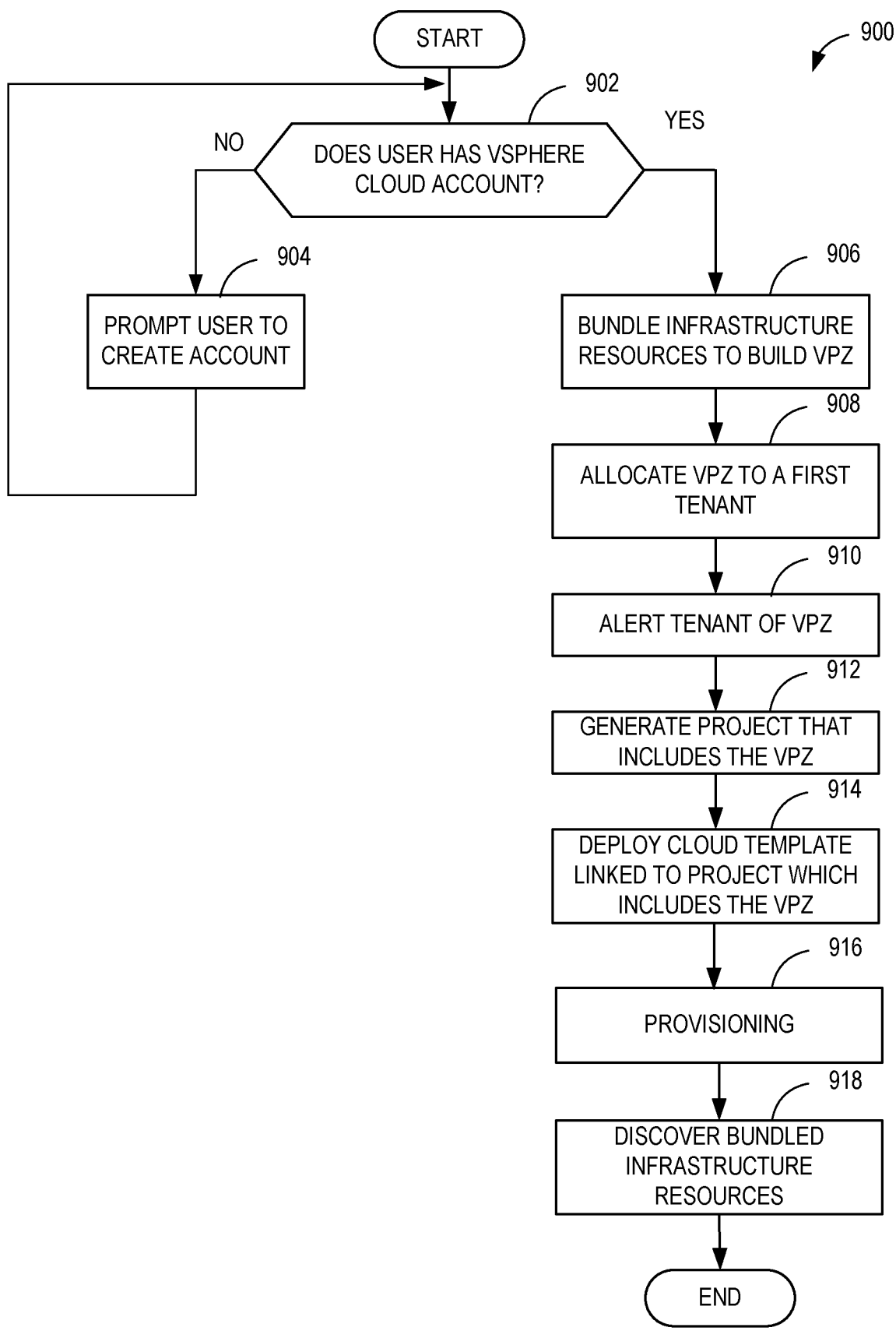
FIGS. 9 and 10 are flowcharts representative of example machine readable instructions that may be executed by example processor circuitry to implement the VPZ generation circuitry of FIG. 4.
Figure 10:
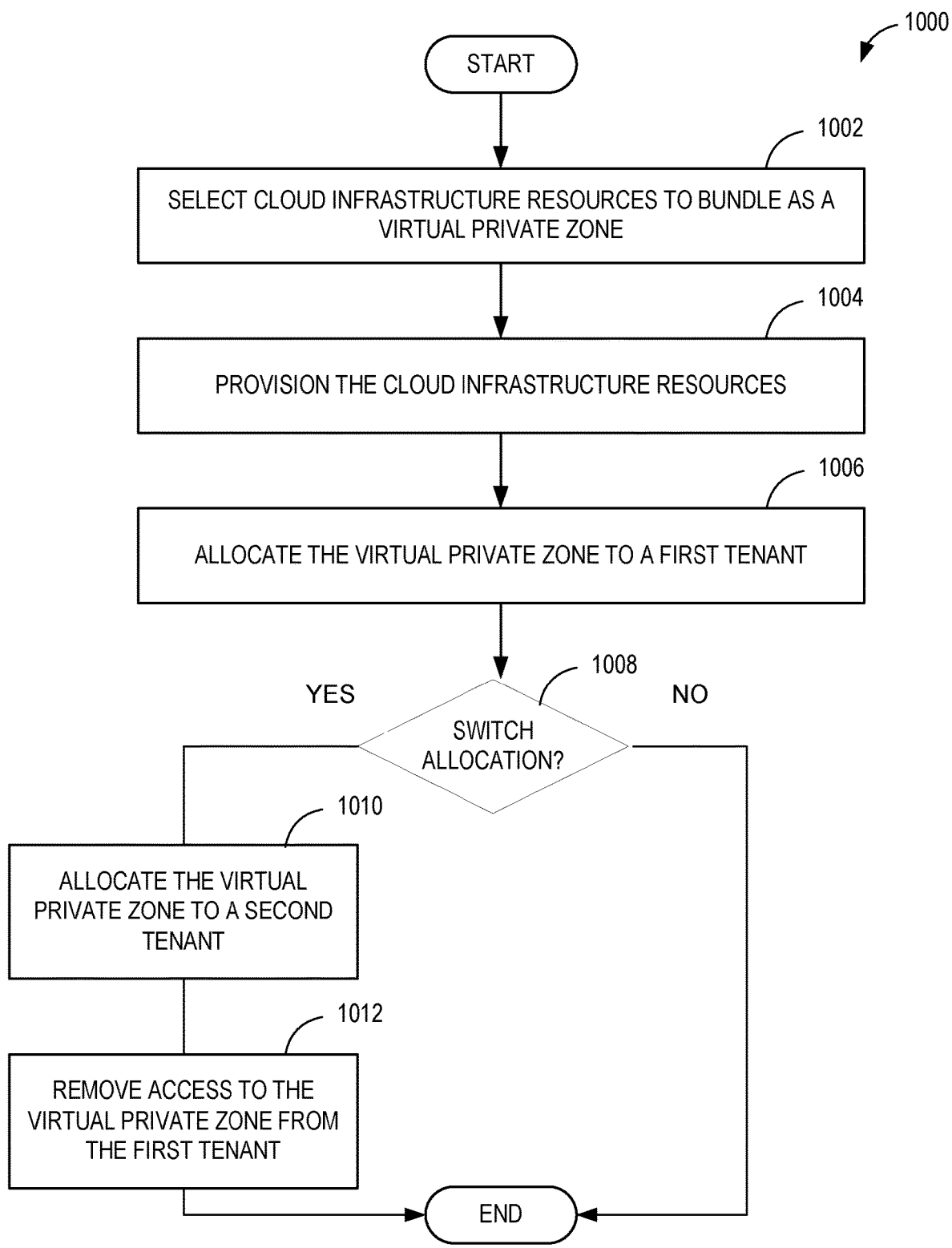

Flowcharts representative of example hardware logic circuitry, machine readable instructions, hardware implemented state machines, and/or any combination thereof for implementing the one or more apparatus including the VPZ generation circuitry 150 of FIGS. 1, 2, and 4 and/or the provisioning circuitry 160 of FIGS. 1 and 2 are shown in FIGS. 9 and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 11, many other methods of implementing the example VPZ generation circuitry 150 and/or the provisioning circuitry 160 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to bundle cloud infrastructure resources as a virtual private zone. The machine readable instructions and/or operations 900 of FIG. 9 begin at block 902, at which the example cloud account determination circuitry 408 (FIG. 4) determines if a user has a cloud account (e.g., vSphere cloud account). In response to determining that the user does not have a cloud account (e.g., block 902: "NO"), control flows to block 904. At block 904, the example cloud account determination circuitry 408 prompts the user to create a cloud account. For example, the cloud account determination circuitry 408 may prompt the user to create a cloud account by suggesting cloud account providers (e.g., Google Cloud Platform, Microsoft Azure, Amazon Web Services). Control flows to block 902.

In response to determining that the user has a cloud account (e.g., block 902: "YES"), control flows to block 906. At block 906, the example resource bundling circuitry 402 (FIG. 4) bundles cloud infrastructure resources to build a virtual private zone. For example, the example resource bundling circuitry 402 may bundle cloud infrastructure resources to build a virtual private zone by using the compute resource circuitry 412, the instance type resource circuitry 414, the images resource circuitry 416, the storage resource circuitry 418, and the network resource circuitry 420 of FIG. 4 to bundle the respective cloud infrastructure resources. The example resource bundling circuitry 402 may bundle the cloud infrastructure resources by assigning a first virtual private zone to the vpzId field (e.g., the example virtual private zone identification field 632 of FIG. 6A, the example virtual private zone identification field 634 of FIG. 6A, the example virtual private zone identification field 636 of FIG. 6A, etc.). For example, the images resource circuitry 416 may assign the support VPZ 504 of FIG. 5 to the example virtual private zone identification field 632 as described in conjunction with FIG. 6A.

At block 908, the example VPZ allocation circuitry 404 allocates the virtual private zone to a first tenant. For example, the VPZ allocation circuitry 404 may allocate the virtual private zone to a first tenant by assigning the first tenant to the tenant organization identification field. For example, the VPZ allocation circuitry 404 may assign the first tenant (e.g., the first tenant 208 of FIG. 2) to the example tenant organization identification field 628 as described in conjunction with FIG. 6A.

At block 910, the example tenant interface 406 alerts the example tenant of the virtual private zone. For example, the tenant interface 406 may alert the example tenant of the virtual private zone by sending an electronic communication that the service provider has allocated the virtual private zone for access by the example tenant.

At block 912, the example provisioning circuitry 160 (FIGS. 1 and 2) generates a project 812 (FIG. 8) that includes the second cloud zone object 808 of FIG. 8 (e.g., the support VPZ 504 of FIG. 5). For example, the example provisioning circuitry 160 may generate a project 812 that includes the virtual private zone (e.g., the second cloud zone object 808 of FIG. 8, the support VPZ 504 of FIG. 5) in response to the example tenant logging in to cloud service platform (e.g., the vRealize Automation® cloud management platform 140), selecting from a dropdown the second cloud zone object 808 (e.g., the support VPZ 504) which has been allocated (e.g., shared, exposed) for provisioning, and adding the selected the second cloud zone object 808 (e.g., the support VPZ 504) to the project 812. The example virtual private zone (e.g., the second cloud zone object 808 of FIG. 8, the support VPZ 504 of FIG. 5) is inside the project 812 of FIG. 8. The example cloud templates 306 of FIG. 3 are linked to (e.g., associated with) example projects (e.g., the example project 812 of FIG. 8, the example project 304 of FIG. 3). The example cloud templates 306 of FIG. 3 are not aware of the example virtual private zones (e.g., the second cloud zone object 808 of FIG. 8, the support VPZ 504 of FIG. 5).

At block 914, the example provisioning circuitry 160 deploys a cloud template 306 (FIG. 3) linked to the example project 812 which includes the second cloud zone object 808 (e.g., the support VPZ 504). For example, the example provisioning circuitry 160 may deploy the cloud template (e.g., the cloud template 306 of FIG. 3) which includes the second cloud zone object 808 (e.g., the support VPZ 504). In response to being deployed, the example provisioning circuitry 160 provisions the cloud infrastructure resources.

At block 916, the example provisioning circuitry 160 provisions the cloud infrastructure resources (e.g., the compute resource specified by the compute resource field 516 of FIGS. 5 and 8, the instance type mapping specified by instance type mapping resource field 520 of FIGS. 5 and 8, the image type mapping specified by the images resource field 522 of FIGS. 5 and 8, storage profile specified by the storage profile resource field 524 of FIGS. 5 and 8, and the network profile specified by the network profile resource field 526 of FIGS. 5 and 8). During provisioning, the provisioning circuitry 160 provisions cloud infrastructure resources for cloud zone objects based on the datacenter (e.g., account, region) of the cloud template and project. However, in response to provisioning a cloud zone object that is a virtual private zone (e.g., the second cloud zone object 808, the support VPZ 504), the provisioning circuitry 160 discovers bundled cloud infrastructure resources and provisions the bundled cloud infrastructure resources. For example, if the example service provider 206 selected a first network profile for the virtual private zone, the example provisioning circuitry 160 determines to use the first network profile in provisioning, rather than to use the network profile associated with the datacenter (e.g., account, region) of the cloud template 306 and project 812. At block 918, the example provisioning circuitry 160 discovers the bundled cloud infrastructure resources based on the virtual private zone identifier (e.g., the virtual private zone identification field 632, 634, 636, or 638 of FIG. 6A). The example instructions 900 end.

FIG. 10 is a flowchart representative of example machine readable instructions and/or example operations 1000 that may be executed and/or instantiated by processor circuitry to bundle cloud infrastructure resources as a virtual private zone. The machine readable instructions and/or operations 1000 of FIG. 10 begin at block 1002, at which the example resource bundling circuitry 402 (FIG. 4) selects cloud infrastructure resources (e.g., the compute resource specified by the compute resource field 516 of FIGS. 5 and 8, the instance type mapping specified by instance type mapping resource field 520 of FIGS. 5 and 8, the image type mapping specified by the images resource field 522 of FIGS. 5 and 8, storage profile specified by the storage profile resource field 524 of FIGS. 5 and 8, and the network profile specified by the network profile resource field 526 of FIGS. 5 and 8). For example, the resource bundling circuitry 402 may select cloud infrastructure resources (e.g., the compute resource specified by the compute resource field 516 of FIGS. 5 and 8, the instance type mapping specified by instance type mapping resource field 520 of FIGS. 5 and 8, the image type mapping specified by the images resource field 522 of FIGS. 5 and 8, storage profile specified by the storage profile resource field 524 of FIGS. 5 and 8, and the network profile specified by the network profile resource field 526 of FIGS. 5 and 8) to bundle as a virtual private zone by determining the virtual private zone identification field 632 for each of the cloud infrastructure resources.

At block 1004, the example provisioning circuitry 160 (FIGS. 1 and 2) provisions the cloud infrastructure resources (e.g., the compute resource specified by the compute resource field 516 of FIGS. 5 and 8, the instance type mapping specified by instance type mapping resource field 520 of FIGS. 5 and 8, the image type mapping specified by the images resource field 522 of FIGS. 5 and 8, storage profile specified by the storage profile resource field 524 of FIGS. 5 and 8, and the network profile specified by the network profile resource field 526 of FIGS. 5 and 8). For example, the provisioning circuitry 160 may provision the cloud infrastructure resources as the second cloud zone object 808 (e.g., the support VPZ 504).

At block 1006, the example VPZ allocation circuitry 404 (FIG. 4) allocates the virtual private zone to a first tenant 208. For example, the VPZ allocation circuitry 404 may allocate the virtual private zone (e.g., the second cloud zone object 808 of FIG. 8, the support VPZ 504 of FIG. 5) to the first tenant 208 (e.g., the cloud assembly infrastructure service provider's tenant organization 860) based on the tenant organization identifier (e.g., the tenant organization identification field 628 of FIG. 6A). For example, the first tenant is authorized to access the cloud infrastructure resources bundled in the virtual private zone.

At block 1008, the example VPZ allocation circuitry 404 determines whether to switch the allocation. The example VPZ allocation circuitry 404 may determine to switch the allocation of the virtual private zone based on input from the service provider which bundled the cloud infrastructure resources as the virtual private zone. For example, the input from the service provider 206 may be a typed command or mouse click to switch the allocation. For example, in response to the determination to switch the allocation (e.g., block 1008: "YES"), control flows to block 1010.

At block 1010, the example VPZ allocation circuitry 404 allocates the first virtual private zone to a second tenant 210 (FIG. 2). For example, the VPZ allocation circuitry 404 may allocate the first virtual private zone (e.g., the second cloud zone object 808 of FIG. 8, the support VPZ 504 of FIG. 5) to a second tenant 210 by replacing the first tenant organization identifier (e.g., the tenant organization identification field 628 of FIG. 6A) which corresponds to the first tenant 208 with a second tenant organization identifier which corresponds to the second tenant 210.

At block 1012, the example VPZ allocation circuitry 404 removes access to the first virtual private zone from the first tenant 208. For example, the VPZ allocation circuitry 404 may remove access to the first virtual private zone (e.g., the second cloud zone object 808 of FIG. 8, the support VPZ 504 of FIG. 5) from the first tenant 208 by removing the first tenant organization identifier that corresponds to the first tenant 208 from the tenant organization identification field 628 of FIG. 6A. After block 1012, or when the VPZ allocation circuitry 404 determines at block 1008 to not switch the allocation, the example instructions 1000 end.

In response to the determination to not switch the allocation (e.g., block 1008: "NO"), the example instructions 1000 end.

Figure 11:
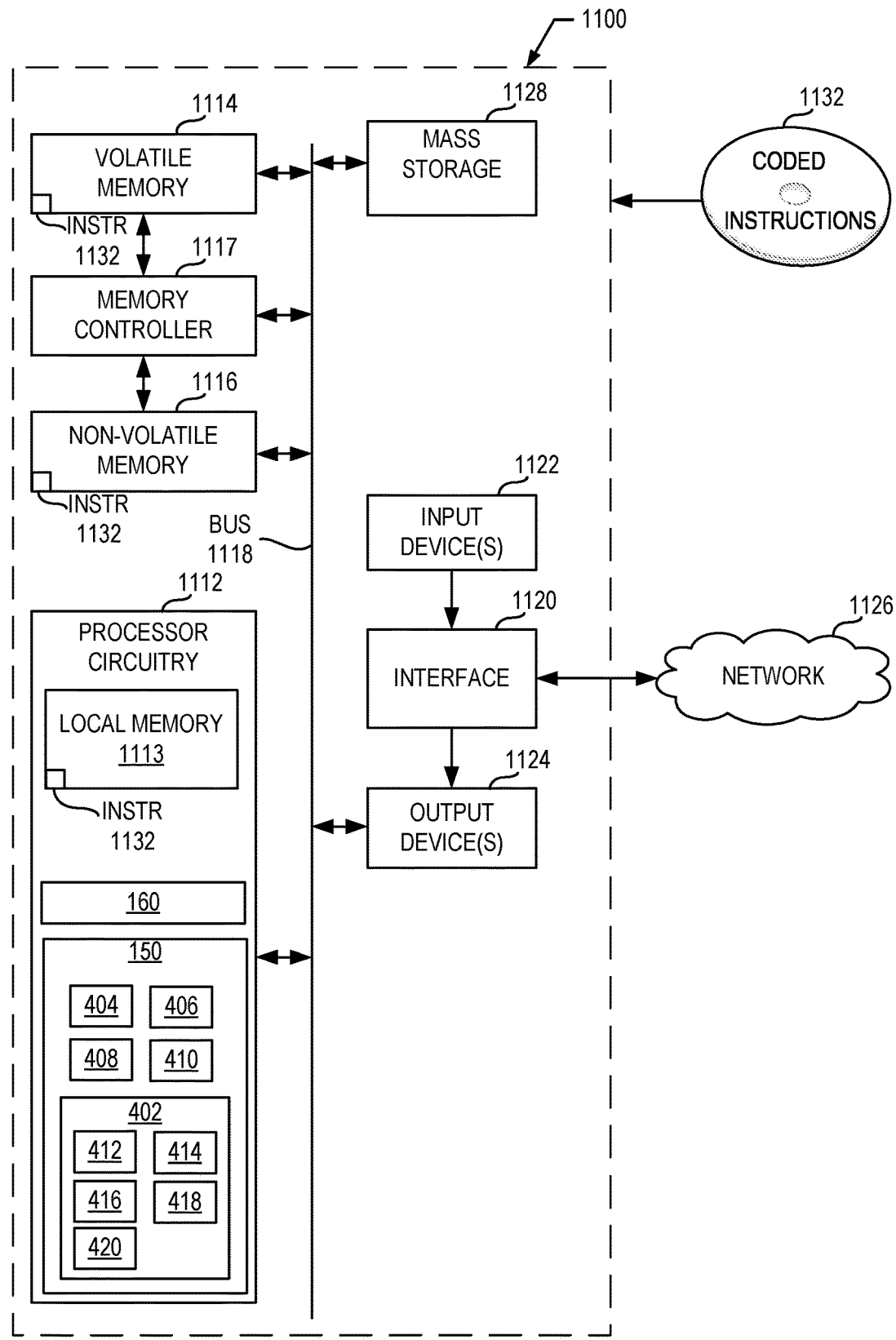
FIG. 11 is a block diagram of an example processing platform including processor circuitry structured to execute the example machine readable instructions of FIGS. 6B, 9, and 10 to implement the VPZ generation circuitry of FIG. 4.

FIG. 11 is a block diagram of an example processor platform 1100 structured to execute and/or instantiate the machine readable instructions and/or operations of FIGS. 9 and 10 to implement the VPZ generation circuitry 150 and/or the provisioning circuitry 160 of FIGS. 1, 2, and 4. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example VPZ generation circuitry 150 (FIGS. 1, 2, and 4) which includes the example resource bundling circuitry 402, the example virtual private zone allocation circuitry 404, the example tenant interface 406, the example cloud account determination circuitry 408, the example policy circuitry 410, the example compute resource circuitry 412, the example instance type resource circuitry 414, the example images resource circuitry 416, the example storage resource circuitry 418, and the example network resource circuitry 420 of FIG. 4. In the illustrated example, the processor circuitry 1112 also implements the example provisioning circuitry 160 (FIGS. 1 and 2).

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS & Dynamic Random Access Memory (RDRAMR), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 9 and 10, may be stored in the mass storage device 1128, in the volatile memory 1114, in the non-volatile memory 1116, and/or on a removable non-transitory computer readable storage medium such as a CD or DVD.

Figure 12:
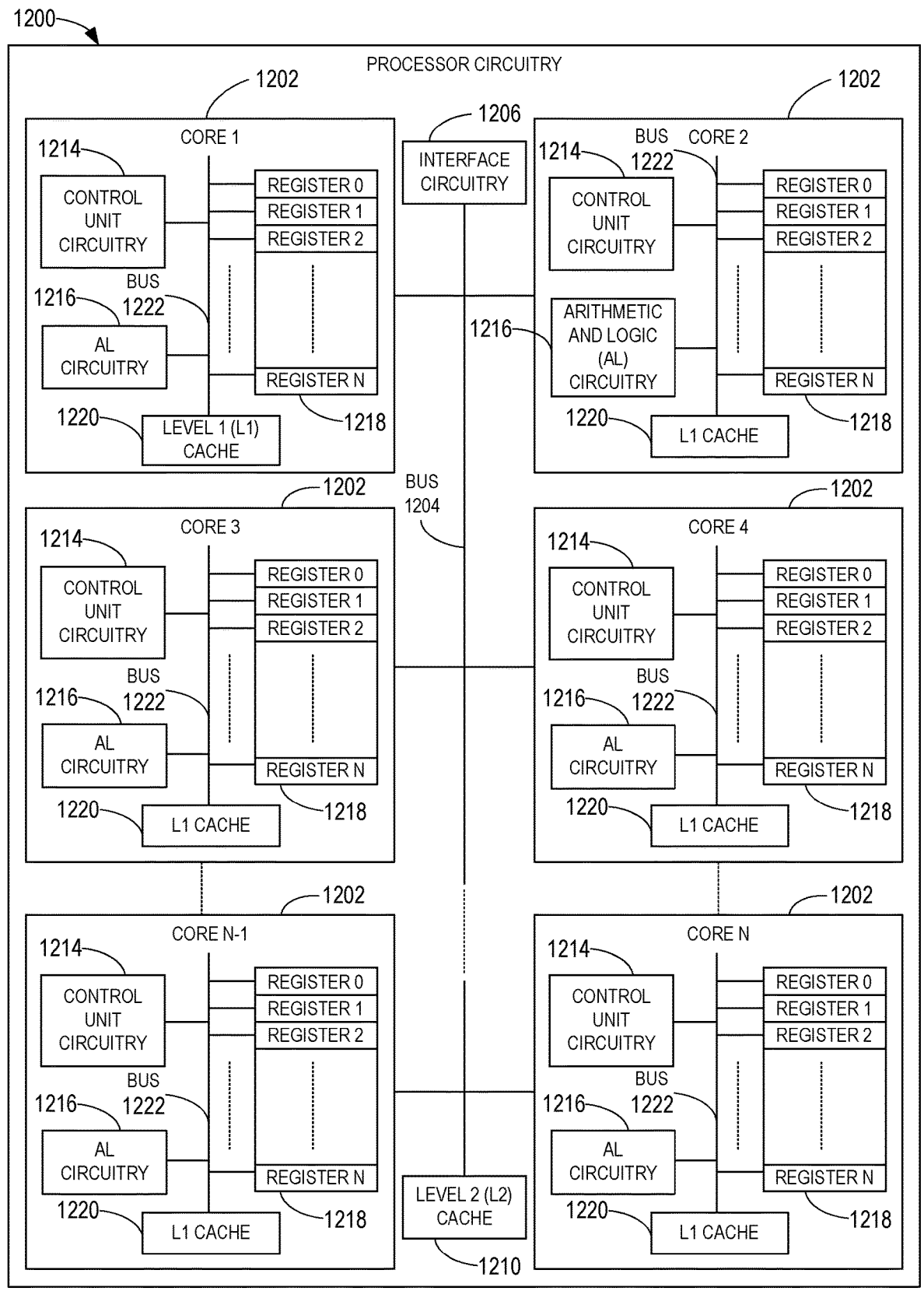
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 9 and 10.

The cores 1202 may communicate by an example first bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11).

Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example second bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
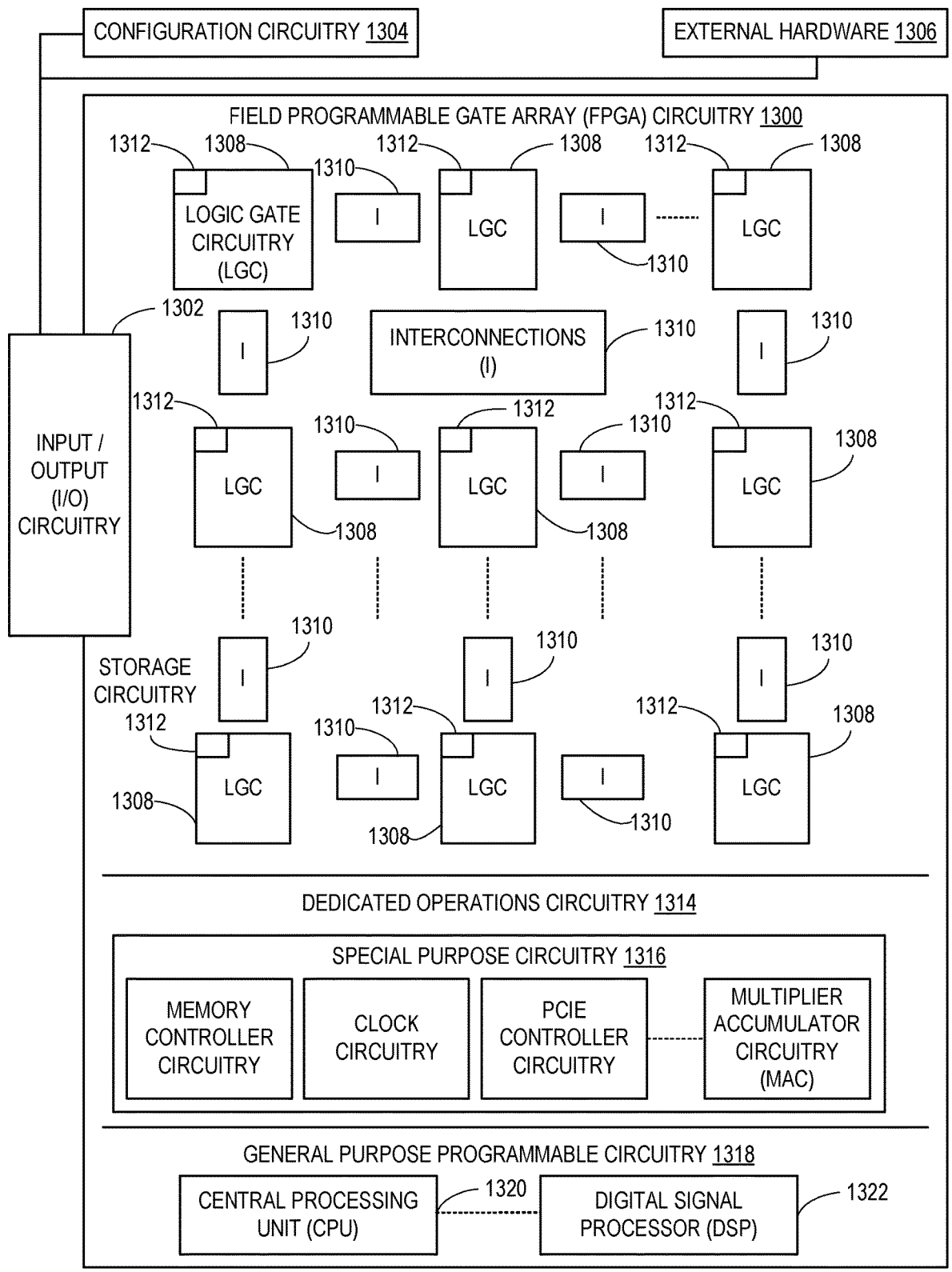
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 9 and 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 9 and 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 9 and 10. As such, the FPGA circuitry 1300 may be structured to effectively instantiate some or all of the machine readable instructions of the flowcharts of FIGS. 9 and 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9 and 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 9 and 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 9 and 10 may be executed by one or more of the cores 1202 of FIG. 12 and a second portion of the machine readable instructions represented by the flowcharts of FIGS. 9 and 10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
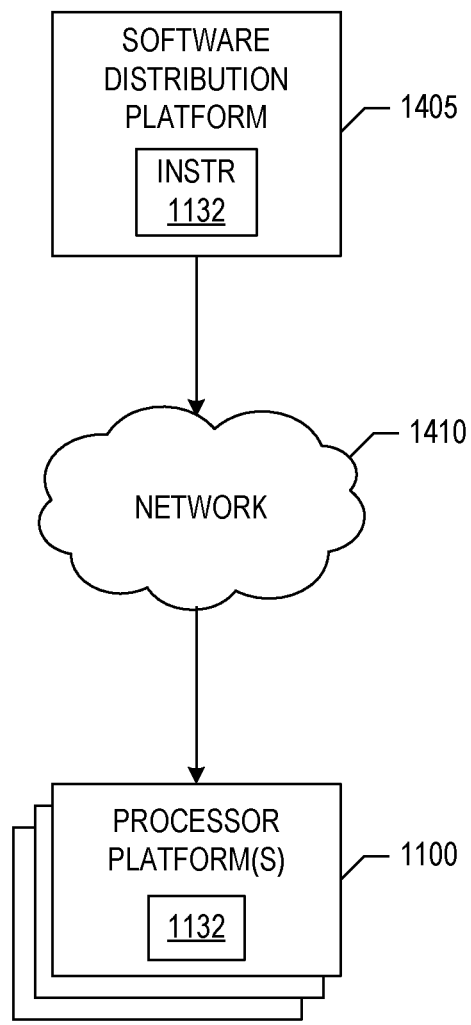
FIG. 14 is a block diagram of an example software distribution platform (e.g., one or more servers) to distribute software (e.g., software corresponding to the example machine readable instructions of FIGS. 6B, 9, and 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 900, 1000 of FIGS. 9 and 10, as described above. The one or more servers of the example software distribution platform 1405 are in communication with a network 1410, which may correspond to any one or more of the Internet and/or any of the example networks 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 1132 of FIG. 11, may be downloaded to the example processor platform 1100, which is to execute the machine readable instructions 1132 to implement the VPZ generation circuitry 150 and/or the provisioning circuitry 160. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that expose cloud infrastructure resources to tenants in a multi-tenant software system. The disclosed systems, methods, apparatus, and articles of manufacture improve the efficiency of using a computing device by reducing wasted resources in allocations of cloud zones. An example service provider can allocate a virtual private zone to a first tenant, and without generating a second virtual private zone for a second tenant which uses more cloud infrastructure resources, switch the allocation of the first virtual private zone from the first tenant to the second tenant. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to expose cloud infrastructure resources to tenants in a multi-tenant software system are disclosed herein. Further examples and combinations thereof include the following:

Example 1 includes an apparatus for provisioning cloud infrastructure resources, the apparatus comprising resource bundling circuitry to select cloud infrastructure resources to bundle as a virtual private zone, provisioning circuitry to provision the cloud infrastructure resources, and allocation circuitry to allocate the virtual private zone to a first tenant, the first tenant authorized to access the cloud infrastructure resources bundled in the virtual private zone.

Example 2 includes the apparatus of example 1, wherein the cloud infrastructure resources include at least one of a compute resource, a storage resource, a network resource, an image mapping, or an instance type mapping.

Example 3 includes the apparatus of example 1, further including cloud account determination circuitry to determine if a user has a cloud account, and in response to the user having the cloud account, allow provisioning of the cloud infrastructure resources based on the cloud account as the virtual private zone.

Example 4 includes the apparatus of example 3, wherein the cloud infrastructure resources are first cloud infrastructure resources, the cloud account determination circuitry to determine second cloud infrastructure resources offered by a provider of the cloud account, the resource bundling circuitry to select the first cloud infrastructure resources from the second cloud infrastructure resources.

Example 5 includes the apparatus of example 1, wherein the allocation circuitry is to determine to switch the allocation of the virtual private zone by removing access to the virtual private zone by the first tenant, and allocating the virtual private zone to a second tenant.

Example 6 includes the apparatus of example 1, further including policy circuitry to prevent the first tenant from accessing version information of one of the cloud infrastructure resources, and allow the first tenant to access a name of the one of the cloud infrastructure resources.

Example 7 includes the apparatus of example 1, wherein the cloud infrastructure resources are linked to the virtual private zone based on a virtual private zone identifier, the virtual private zone identifier corresponding to the virtual private zone.

Example 8 includes the apparatus of example 1, wherein the virtual private zone includes a pointer to an organization of the first tenant.

Example 9 includes the apparatus of example 1, wherein the provisioning circuitry is to create a project including the virtual private zone and the first tenant.

Example 10 includes the apparatus of example 1, wherein the virtual private zone is a cloud zone object, the cloud zone object to include at least one of an instance type mapping, an image type mapping, a storage profile, or a network profile.

Example 11 includes an apparatus comprising at least one memory, instructions in the apparatus, and processor circuitry to execute the instructions to select cloud infrastructure resources to bundle as a virtual private zone, provision the cloud infrastructure resources, and allocate the virtual private zone to a first tenant, the first tenant authorized to access the cloud infrastructure resources bundled in the virtual private zone.

Example 12 includes the apparatus of example 11, wherein the cloud infrastructure resources include at least one of a compute resource, a storage resource, a network resource, an image mapping, or an instance type mapping.

Example 13 includes the apparatus of example 11, wherein the processor circuitry is to execute the instructions to determine if a user has a cloud account, and in response to the user having the cloud account, allow provisioning of the cloud infrastructure resources based on the cloud account as the virtual private zone.

Example 14 includes the apparatus of example 13, wherein the cloud infrastructure resources are first cloud infrastructure resources, the processor circuitry to execute the instructions to determine second cloud infrastructure resources offered by a provider of the cloud account, and select the first cloud infrastructure resources from the second cloud infrastructure resources.

Example 15 includes the apparatus of example 11, wherein the processor circuitry is to execute the instructions to determine to switch the allocation of the virtual private zone by removing access to the virtual private zone by the first tenant, and allocating the virtual private zone to a second tenant.

Example 16 includes the apparatus of example 11, wherein the processor circuitry is to execute the instructions to prevent the first tenant from accessing version information of one of the cloud infrastructure resources, and allow the first tenant to access a name of the one of the cloud infrastructure resources.

Example 17 includes the apparatus of example 11, wherein the cloud infrastructure resources are linked to the virtual private zone based on a virtual private zone identifier, the virtual private zone identifier corresponding to the virtual private zone.

Example 18 includes the apparatus of example 11, wherein the virtual private zone includes a pointer to an organization of the first tenant.

Example 19 includes the apparatus of example 11, wherein the processor circuitry is to execute the instructions to create a project including the virtual private zone and the first tenant.

Example 20 includes the apparatus of example 11, wherein the virtual private zone is a cloud zone object, the cloud zone object to include at least one of an instance type mapping, an image type mapping, a storage profile, or a network profile.

Example 21 includes a non-transitory computer readable medium comprising instructions that, when executed, cause processor circuitry to at least select cloud infrastructure resources to bundle as a virtual private zone, provision the cloud infrastructure resources, and allocate the virtual private zone to a first tenant, the first tenant authorized to access the cloud infrastructure resources bundled in the virtual private zone.

Example 22 includes the non-transitory computer readable medium of example 21, wherein the cloud infrastructure resources include at least one of a compute resource, a storage resource, a network resource, an image mapping, or an instance type mapping.

Example 23 includes the non-transitory computer readable medium of example 21, wherein the instructions are to cause the processor circuitry to determine if a user has a cloud account, and in response to the user having the cloud account, allow provisioning of the cloud infrastructure resources based on the cloud account as the virtual private zone.

Example 24 includes the non-transitory computer readable medium of example 23, wherein the cloud infrastructure resources are first cloud infrastructure resources, the instructions to cause the processor circuitry to determine second cloud infrastructure resources offered by a provider of the cloud account, and select the first cloud infrastructure resources from the second cloud infrastructure resources.

Example 25 includes the non-transitory computer readable medium of example 21, wherein the instructions are to cause the processor circuitry to determine to switch the allocation of the virtual private zone by removing access to the virtual private zone by the first tenant, and allocating the virtual private zone to a second tenant.

Example 26 includes the non-transitory computer readable medium of example 21, wherein the instructions are to cause the processor circuitry to prevent the first tenant from accessing version information of one of the cloud infrastructure resources, and allow the first tenant to access a name of the one of the cloud infrastructure resources.

Example 27 includes the non-transitory computer readable medium of example 21, wherein the cloud infrastructure resources are linked to the virtual private zone based on a virtual private zone identifier, the virtual private zone identifier corresponding to the virtual private zone.

Example 28 includes the non-transitory computer readable medium of example 21, wherein the virtual private zone includes a pointer to an organization of the first tenant.

Example 29 includes the non-transitory computer readable medium of example 21, wherein the instructions are to cause the processor circuitry to create a project including the virtual private zone and the first tenant.

Example 30 includes the non-transitory computer readable medium of example 21, wherein the virtual private zone is a cloud zone object, the cloud zone object to include at least one of an instance type mapping, an image type mapping, a storage profile, or a network profile.

Example 31 includes a method to provision cloud infrastructure resources, the method comprising selecting cloud infrastructure resources to bundle as a virtual private zone, provisioning the cloud infrastructure resources, and allocating the virtual private zone to a first tenant, the first tenant authorized to access the cloud infrastructure resources bundled in the virtual private zone.

Example 32 includes the method of example 31, wherein the cloud infrastructure resources include at least one of a compute resource, a storage resource, a network resource, an image mapping, or an instance type mapping.

Example 33 includes the method of example 31, further including determining if a user has a cloud account, and in response to the user having the cloud account, allowing the provisioning of the cloud infrastructure resources based on the cloud account as the virtual private zone.

Example 34 includes the method of example 33, wherein the cloud infrastructure resources are first cloud infrastructure resources, and further including determining second cloud infrastructure resources offered by a provider of the cloud account, and selecting the first cloud infrastructure resources from the second cloud infrastructure resources.

Example 35 includes the method of example 31, further including determining to switch the allocation of the virtual private zone by removing access to the virtual private zone by the first tenant, and allocating the virtual private zone to a second tenant.

Example 36 includes the method of example 31, further including preventing the first tenant from accessing version information of one of the cloud infrastructure resources, and allowing the first tenant to access a name of the one of the cloud infrastructure resources.

Example 37 includes the method of example 31, wherein the cloud infrastructure resources are linked to the virtual private zone based on a virtual private zone identifier, the virtual private zone identifier corresponding to the virtual private zone.

Example 38 includes the method of example 31, wherein the virtual private zone includes a pointer to an organization of the first tenant.

Example 39 includes the method of example 31, further including creating a project including the virtual private zone and the first tenant.

Example 40 includes the method of example 31, wherein the virtual private zone is a cloud zone object, the cloud zone object to include at least one of an instance type mapping, an image type mapping, a storage profile, or a network profile.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for provisioning cloud infrastructure resources, the apparatus comprising:
   resource bundling circuitry to select cloud infrastructure resources to bundle as a virtual private zone;
   provisioning circuitry to provision the cloud infrastructure resources; and
   allocation circuitry to allocate the virtual private zone to a first tenant, the first tenant authorized to access the cloud infrastructure resources bundled in the virtual private zone;
   wherein the virtual private zone includes a pointer to an organization of the first tenant.

2. The apparatus of claim 1, wherein the cloud infrastructure resources include at least one of a compute resource, a storage resource, a network resource, an image mapping, or an instance type mapping.

3. The apparatus of claim 1, further including cloud account determination circuitry to:
   determine if a user has a cloud account; and
   in response to the user having the cloud account, allow provisioning of the cloud infrastructure resources based on the cloud account as the virtual private zone.

4. The apparatus of claim 3, wherein the cloud infrastructure resources are first cloud infrastructure resources, the cloud account determination circuitry to determine second cloud infrastructure resources offered by a provider of the cloud account, the resource bundling circuitry to select the first cloud infrastructure resources from the second cloud infrastructure resources.

5. The apparatus of claim 1, wherein the allocation circuitry is to determine to switch the allocation of the virtual private zone by:
   removing access to the virtual private zone by the first tenant; and
   allocating the virtual private zone to a second tenant.

6. The apparatus of claim 1, further including policy circuitry to:
   prevent the first tenant from accessing version information of one of the cloud 2 infrastructure resources; and
   allow the first tenant to access a name of the one of the cloud infrastructure resources.

7. The apparatus of claim 1, wherein the cloud infrastructure resources are linked to the virtual private zone based on a virtual private zone identifier, the virtual private zone identifier corresponding to the virtual private zone.

8. The apparatus of claim 1, wherein the provisioning circuitry is to create a project including the virtual private zone and the first tenant.

9. The apparatus of claim 1, wherein the virtual private zone is a cloud zone object, the cloud zone object to include at least one of an instance type mapping, an image type mapping, a storage profile, or a network profile.

10. An apparatus comprising:
at least one memory;
instructions in the apparatus; and
processor circuitry to execute the instructions to:
select cloud infrastructure resources to bundle as a virtual private zone;
provision the cloud infrastructure resources; and
allocate the virtual private zone to a first tenant, the first tenant authorized to access the cloud infrastructure resources bundled in the virtual private zone;
wherein the virtual private zone is a cloud zone object, the cloud zone object to include at least one of an instance type mapping, an image type mapping, a storage profile, or a network profile.

11. The apparatus of claim 10, wherein the cloud infrastructure resources include at least one of a compute resource, a storage resource, a network resource, an image mapping, or an instance type mapping.

12. The apparatus of claim 10, wherein the processor circuitry is to execute the instructions to:
determine if a user has a cloud account; and
in response to the user having the cloud account, allow provisioning of the cloud infrastructure resources based on the cloud account as the virtual private zone.

13. The apparatus of claim 12, wherein the cloud infrastructure resources are first cloud infrastructure resources, the processor circuitry to execute the instructions to:
determine second cloud infrastructure resources offered by a provider of the cloud account; and
select the first cloud infrastructure resources from the second cloud infrastructure resources.

14. The apparatus of claim 10, wherein the processor circuitry is to execute the instructions to determine to switch the allocation of the virtual private zone by:
removing access to the virtual private zone by the first tenant; and
allocating the virtual private zone to a second tenant.

15. The apparatus of claim 10, wherein the processor circuitry is to execute the instructions to:
prevent the first tenant from accessing version information of one of the cloud infrastructure resources; and
allow the first tenant to access a name of the one of the cloud infrastructure resources.

16. The apparatus of claim 10, wherein the cloud infrastructure resources are linked to the virtual private zone based on a virtual private zone identifier, the virtual private zone identifier corresponding to the virtual private zone.

17. The apparatus of claim 10, wherein the virtual private zone includes a pointer to an organization of the first tenant.

18. The apparatus of claim 10, wherein the processor circuitry is to execute the instructions to create a project including the virtual private zone and the first tenant.

19. A non-transitory computer-readable medium comprising instructions that, when executed, cause processor circuitry to at least:
select cloud infrastructure resources to bundle as a virtual private zone;
provision the cloud infrastructure resources;
allocate the virtual private zone to a first tenant, the first tenant authorized to access the cloud infrastructure resources bundled in the virtual private zone;
prevent the first tenant from accessing version information of one of the cloud infrastructure resources; and
allow the first tenant to access a name of the one of the cloud infrastructure resources.

20. The non-transitory computer-readable e medium of claim 19, wherein the cloud infrastructure resources include at least one of a compute resource, a storage resource, a network resource, an image mapping, or an instance type mapping.

21. The non-transitory computer-readable medium of claim 19, wherein the instructions are to cause the processor circuitry to:
determine if a user has a cloud account; and
in response to the user having the cloud account, allow provisioning of the cloud infrastructure resources based on the cloud account as the virtual private zone.

22. The non-transitory computer-readable medium of claim 21, wherein the cloud infrastructure resources are first cloud infrastructure resources, the instructions to cause the processor circuitry to:
determine second cloud infrastructure resources offered by a provider of the cloud account; and
select the first cloud infrastructure resources from the second cloud infrastructure resources.

23. The non-transitory computer-readable medium of claim 19, wherein the instructions are to cause the processor circuitry to determine to switch the allocation of the virtual private zone by:
removing access to the virtual private zone by the first tenant; and
allocating the virtual private zone to a second tenant.

24. The non-transitory computer-readable medium of claim 19, wherein the cloud infrastructure resources are linked to the virtual private zone based on a virtual private zone identifier, the virtual private zone identifier corresponding to the virtual private zone.

25. The non-transitory computer-readable medium of claim 19, wherein the virtual private zone includes a pointer to an organization of the first tenant.

26. The non-transitory computer-readable medium of claim 19, wherein the instructions are to cause the processor circuitry to create a project including the virtual private zone and the first tenant.

27. The non-transitory computer-readable medium of claim 19, wherein the virtual private zone is a cloud zone object, the cloud zone object to include at least one of an instance type mapping, an image type mapping, a storage profile, or a network profile.

* * * * *